(12) United States Patent
Lahr et al.

(10) Patent No.: US 10,864,813 B2
(45) Date of Patent: Dec. 15, 2020

(54) BACK-TO-BACK SELECTABLE ONE-WAY CLUTCHES FOR ENGINE DISCONNECT DEVICES OF MOTOR VEHICLE POWERTRAINS

(71) Applicant: GM Global Technology Operations LLC, Detroit, MI (US)

(72) Inventors: Derek F. Lahr, Howell, MI (US);
Velmurugan Ayyanar, Pondicherry (IN); Dongxu Li, Troy, MI (US);
Chunhao J. Lee, Troy, MI (US);
Farzad Samie, Franklin, MI (US);
Dmitriy Bruder, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 69 days.

(21) Appl. No.: 16/382,970

(22) Filed: Apr. 12, 2019

(65) Prior Publication Data
US 2020/0324755 A1    Oct. 15, 2020

(51) Int. Cl.
*B60K 6/383*     (2007.10)
*F16H 29/02*     (2006.01)
(Continued)

(52) U.S. Cl.
CPC ............ *B60K 6/383* (2013.01); *F16H 29/02* (2013.01); *B60W 20/10* (2013.01); *F16D 31/02* (2013.01);
(Continued)

(58) Field of Classification Search
CPC ......... B60K 6/383; B60K 6/387; F16H 29/02; F16H 2045/002; F16H 2045/0221;
(Continued)

(56) References Cited

U.S. PATENT DOCUMENTS

| 4,860,861 A | 8/1989 | Gooch et al. |
| 5,931,271 A * | 8/1999 | Haka ............... B60K 6/26 192/48.92 |

(Continued)

FOREIGN PATENT DOCUMENTS

| JP | 2005-207515 | * | 8/2005 |
| JP | 6354203 B2 | | 9/2015 |

OTHER PUBLICATIONS

Machine language translation of Yamashita JP2005-207515.*

*Primary Examiner* — Mark A Manley
(74) *Attorney, Agent, or Firm* — Quinn IP Law

(57) ABSTRACT

Presented are dual-clutch engine disconnect devices, methods for making/using such disconnect devices, and motor vehicles equipped with such disconnect devices. An engine disconnect device for a vehicle includes a first one-way clutch (OWC) with concentric inner and outer races and torque elements interposed between and transferring torque across these races in a first direction. The first outer race rigidly attaches to a damper plate for common rotation therewith, and the first inner race rigidly attaches to a pump cover of a torque converter for common rotation therewith. A second OWC, which concentrically aligns within the first OWC, includes concentric inner and outer races with torque elements interposed between and transferring torque across these races in a second direction. The second outer race is splined to the first inner race for common rotation with the pump cover. The second inner race rigidly attaches to the damper plate for common rotation therewith.

20 Claims, 11 Drawing Sheets

(51) Int. Cl.
  *F16H 45/00* (2006.01)
  *B60W 20/10* (2016.01)
  *F16D 21/06* (2006.01)
  *F16D 31/02* (2006.01)
  *F16D 11/00* (2006.01)

(52) U.S. Cl.
  CPC .......... *F16D 2011/008* (2013.01); *F16D 2021/0607* (2013.01); *F16D 2500/1026* (2013.01); *F16H 2045/002* (2013.01)

(58) Field of Classification Search
  CPC ...... F16H 2061/145–147; B60W 20/10; F16D 2500/1026; F16D 2021/0607; F16D 31/02; F16D 2011/008; F16D 41/088; F16D 41/08–105
  See application file for complete search history.

(56) References Cited

U.S. PATENT DOCUMENTS

| | | | |
|---|---|---|---|
| 5,947,243 | A | 9/1999 | MacDonald |
| 7,198,587 | B2 | 4/2007 | Samie et al. |
| 7,681,675 | B2 | 3/2010 | Samie et al. |
| 7,824,292 | B2 | 11/2010 | Samie et al. |
| 7,862,437 | B2 | 1/2011 | Clark et al. |
| 7,878,935 | B2 | 2/2011 | Lahr |
| 7,931,561 | B2 | 4/2011 | Otanez et al. |
| 7,980,992 | B2 | 7/2011 | Sturgin |
| 8,011,464 | B2 | 9/2011 | Samie et al. |
| 8,029,403 | B2 | 10/2011 | Lee et al. |
| 8,042,669 | B2 | 10/2011 | Samie et al. |
| 8,042,670 | B2 | 10/2011 | Bartos et al. |
| 8,056,690 | B2 | 11/2011 | Samie et al. |
| 8,061,496 | B2 | 11/2011 | Samie et al. |
| 8,083,042 | B2 | 12/2011 | Samie et al. |
| 8,087,502 | B2 | 1/2012 | Samie et al. |
| 8,177,677 | B2 | 5/2012 | Samie et al. |
| 8,196,724 | B2 | 6/2012 | Samie et al. |
| 8,202,198 | B2 | 6/2012 | Samie et al. |
| 8,287,411 | B2 | 10/2012 | Lee et al. |
| 8,296,020 | B2 | 10/2012 | Lee et al. |
| 8,348,796 | B2 | 1/2013 | Samie et al. |
| 8,357,069 | B2 | 1/2013 | Diemer et al. |
| 8,371,982 | B2 | 2/2013 | Lee et al. |
| 8,371,984 | B2 | 2/2013 | Diemer et al. |
| 8,409,053 | B2 | 4/2013 | Samie et al. |
| 8,425,364 | B2 | 4/2013 | Lahr |
| 8,454,466 | B2 | 6/2013 | Samie et al. |
| 8,469,847 | B2 | 6/2013 | Lee et al. |
| 8,478,498 | B2 | 7/2013 | Lee et al. |
| 8,494,738 | B2 | 7/2013 | Lee et al. |
| 8,499,912 | B2 | 8/2013 | Samie et al. |
| 8,540,065 | B2 | 9/2013 | Samie et al. |
| 8,606,709 | B2 | 12/2013 | Gupta |
| 8,622,186 | B2 | 1/2014 | Samie et al. |
| 8,655,525 | B2 | 2/2014 | Samie et al. |
| 2002/0019286 | A1 | 2/2002 | Goto et al. |
| 2005/0126878 | A1 | 6/2005 | Samie |
| 2010/0184559 | A1 | 7/2010 | Tang et al. |
| 2012/0090952 | A1 | 4/2012 | Lee et al. |
| 2013/0319812 | A1 | 12/2013 | Wys et al. |
| 2014/0144735 | A1 | 5/2014 | Berwanger |
| 2017/0328455 | A1 | 11/2017 | Li et al. |
| 2017/0328456 | A1 | 11/2017 | Samie et al. |
| 2018/0163793 | A1 | 6/2018 | Jeong et al. |
| 2018/0355962 | A1 | 12/2018 | Lahr et al. |

* cited by examiner

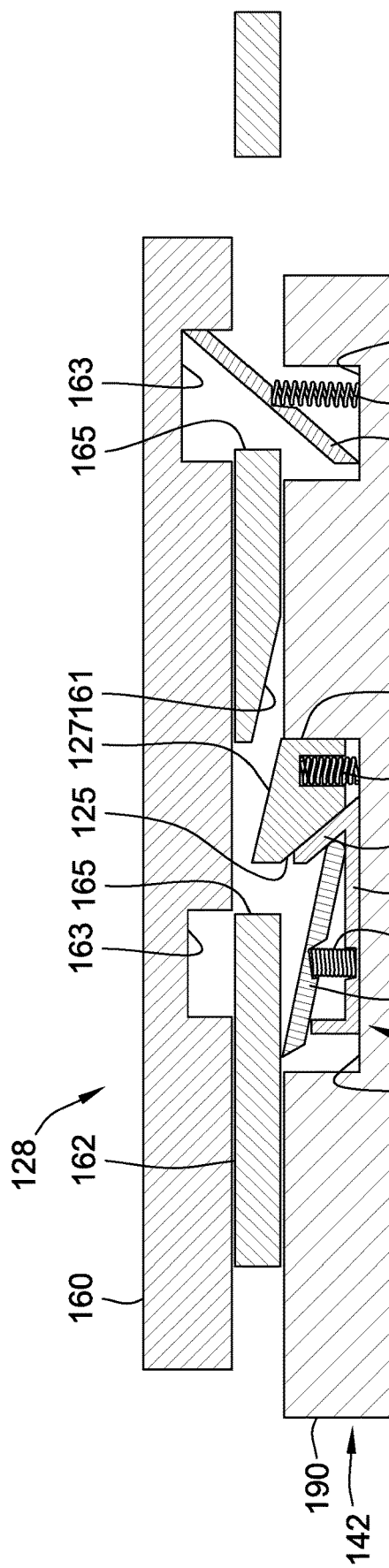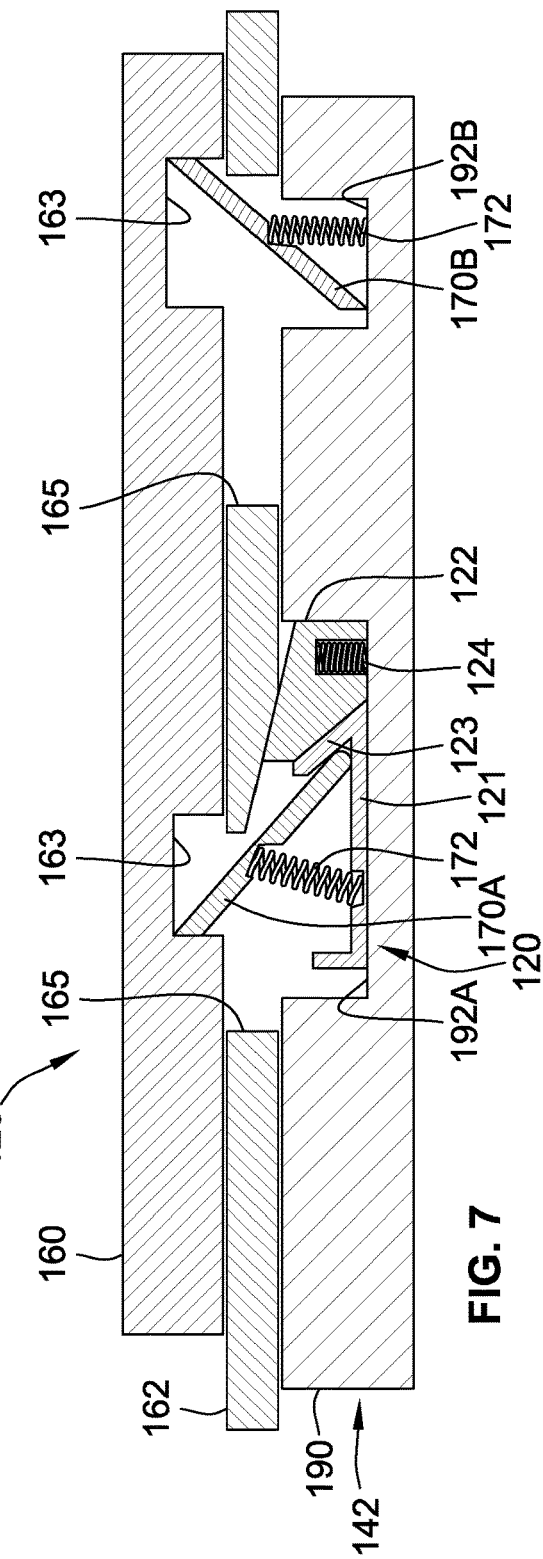
FIG. 6
FIG. 7

BACK-TO-BACK SELECTABLE ONE-WAY CLUTCHES FOR ENGINE DISCONNECT DEVICES OF MOTOR VEHICLE POWERTRAINS

INTRODUCTION

The present disclosure relates generally to motor vehicle powertrains. More specifically, aspects of this disclosure relate to engine disconnect devices with attendant control logic and hydraulic hardware for hybrid electric powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full electric vehicles, on the other hand, utilize alternative power sources to propel the vehicle and, thus, minimize or eliminate reliance on a fossil-fuel based engine for tractive power.

A full electric vehicle (FEV)—colloquially referred to as an "electric car"—is a type of electric-drive vehicle configuration that altogether removes the internal combustion engine and attendant peripheral components from the powertrain system, relying solely on electric traction motors for propulsion and for supporting accessory loads. The engine, fuel supply system, and exhaust system of an ICE-based vehicle are replaced with an electric motor, a traction battery back, and battery cooling and charging electronics in an FEV. Hybrid vehicle powertrains, in contrast, employ multiple sources of tractive power to propel the vehicle, most commonly operating an internal combustion engine assembly in conjunction with a battery-powered or fuel-cell-powered electric motor. A hybrid electric vehicle (HEV), for example, is generally equipped with an ICE assembly and an electric machine (E-machine), often in the form of a motor/generator unit (MGU), that operate individually or cooperatively to generate tractive power. Since hybrid vehicles are able to derive their power from sources other than the engine, HEV engines may be turned off, in whole or in part, while the vehicle is propelled by the electric motor(s).

There are three basic hybrid vehicle powertrain architectures: parallel hybrid, series hybrid, and series-parallel ("power-split") hybrid configurations. Series hybrid architectures, for example, derive all tractive power from electric motors and therefore eliminate any driving mechanical connection between the engine and final drive members. In this case, the engine functions solely as a regenerative energy source, driving an electric generator that charges the vehicle's onboard traction battery pack. In parallel hybrid architectures, the engine and motor/generator assemblies each has a driving mechanical coupling to the power transmission and, thus, the vehicle's road wheels. As the name implies, series-parallel hybrid architectures combine features from both parallel hybrid and series hybrid powertrains. With gas-only and electric-only operating modes, the engine and motor work independently or jointly—in parallel or in series—depending on the desired vehicle speed, overall vehicle power demand, and state-of-charge (SOC) of the battery.

Vehicle powertrains employing an automatic transmission commonly insert a hydrodynamic torque converter between the internal combustion engine and the multi-speed transmission to govern the transfer of rotational power therebetween. Torque converters are designed to selectively transmit power from the engine to the drivetrain system for vehicle propulsion, and to allow the crankshaft to spin without the engine stalling when the vehicle wheels and transmission gears come to a stop. Replacing the mechanical clutch of a manual transmission, a standard torque converter (TC) acts as a fluid coupling with a fluid impeller that is connected to the engine's output shaft, a turbine that is connected to the transmission's input shaft, and a stator interposed between the impeller and turbine to regulate fluid flow between their respective fluid volumes. A hydraulic pump modulates fluid pressure within the torque converter housing to regulate the transfer of rotational energy from the impeller to the turbine. A large difference in speed between the impeller and turbine results in torque multiplication of the impeller torque, as for example when the vehicle is accelerating from rest with the engine running.

Some torque converters are equipped with an internal clutch mechanism that is engaged to rigidly connect the engine's crankshaft to the transmission's input shaft when their speeds are nearly equal, e.g., to avoid unwanted slippage and resultant efficiency losses. System "slip" occurs because the rotational speeds of the impeller relative to the turbine in the torque converter are inherently different. A large slip percentage between the engine output and transmission input affects the fuel economy of the vehicle; employing a torque converter clutch (TCC) helps to significantly reduce the slip. The TCC operates to mechanically lock the impeller at the output of the engine to the turbine at the input of the transmission so that the engine output and transmission input rotate at the same speed. Application of the TCC may be controlled by a powertrain control module (PCM) to modify clutch engaging forces under certain operating conditions, for example, during clutch-to-clutch shifts to eliminate undesired torque fluctuations and engine speed changes during transient periods when torque flow interruption is desired.

One of the many available types of parallel hybrid powertrains is the parallel two-clutch (P2) architecture, which may be typified by a single engine, an automatic power transmission, and a single motor/generator unit that is "side attached" to the transmission in parallel power-flow communication to the engine. Mechanically interposed between the engine and motor/generator unit is a disconnect clutch that, unlike the TCC discussed above, drivingly disengages the engine from both the MGU and transmission such that the MGU can be operated independent of the engine to propel the vehicle. P2 architectures help to reduce system costs over counterpart hybrid powertrains by eliminating the use of additional MGUs and reducing the complexity of the transmission. The P2 architecture also helps to eliminate engine friction during regenerative braking operations, and allows the motor/generator to spin at higher speeds while recovering more energy.

SUMMARY

Disclosed herein are multi-clutch engine disconnect devices, hybrid powertrain architectures using such engine disconnect devices, methods for making and methods for operating such engine disconnect devices, and motor vehicles equipped with such engine disconnect devices. By way of example, there are presented P2 parallel hybrid powertrains with a "back-to-back" selectable one-way clutch (SOWC) device for drivingly connecting and disconnecting an ICE assembly to/from the vehicle's drivetrain. The back-to-back SOWC may be typified by a roller-type "negative torque" OWC that is concentrically aligned within and arranged in parallel power flow communication with a roller-type "positive torque" OWC. Mounting these two roller-type clutches to freewheel in opposite directions concomitantly allows the engine disconnect device to carry torque in both forward (positive) and rearward (negative) directions. Both the positive and negative OWCs may be active or, alternatively, one clutch may be passive; in so doing, one or both clutches may be selectively actuated (engaged or disengaged) such that the engine disconnect device operates as a SOWC. The inner race of the positive OWC may be splined to the outer race of the negative OWC, with these two splined races bolted, riveted, welded or otherwise rigidly attached to an engine-side pump cover of the TC housing. Outer and inner races of the positive and negative OWCs, respectively, may be rigidly attached to a spring-loaded torsional damper plate.

Attendant benefits for at least some of the disclosed SOWC engine disconnect device configurations include powertrain architectures that help to mitigate rotational backlash and resultant noise during transient vehicle operation, including transitions between motor-only and motor-assist operating modes. In addition to improving noise, vibration, and harshness (NVH) performance, disclosed features also help to improve engine disconnect response time for hybrid vehicles during coasting and motor-only operating modes. With proposed hybrid powertrain architectures and control methodologies, increased fuel economy and reduced emissions are realized with minimal additional cost and powertrain packaging space. Disclosed SOWC designs also minimize packaging space requirements by reducing the axial length of the engine disconnect device.

Aspects of this disclosure are directed to back-to-back SOWC engine disconnect devices for managing the transfer of torque between an internal combustion engine and a hydrodynamic torque converter. In an example, an engine disconnect device is presented for a motor vehicle, which includes an engine, a flexplate fixed to the engine's crankshaft, a torsional damper assembly with a damper plate operatively connected to the flexplate, and a hydrodynamic torque converter (TC) assembly interposed between the engine and transmission. The engine disconnect device includes two OWCs, each fabricated with respective inner and outer annular races and a series of circumferentially spaced torque transmitting elements interposed between the inner and outer races. For the first OWC, the torque elements transfer torque across the inner and outer races thereof in a first (e.g., positive) direction. Conversely, the torque elements of the second OWC transfer torque across the inner and outer races thereof in a second (e.g., negative) direction. The outer (or inner) race of the first OWC operatively attaches to the torsional damper plate for common rotation therewith, whereas the inner (or outer) race operatively attaches to the TC pump cover for common rotation therewith. The second OWC is coaxially aligned with the first OWC, with the second outer race operatively attached, e.g., via splined engagement, to the first inner race for common rotation with the first inner race and TC pump cover. A selector plate disposed adjacent the first and second OWCs is selectively actuable to translate between activated and deactivated states to thereby switch one or both OWCs between torque-carrying and non-torque-carrying states, respectively.

Additional aspects of this disclosure are directed to electric-drive vehicles and hybrid electric powertrains equipped with back-to-back SOWC engine disconnect devices. As used herein, the term "motor vehicle" may include any relevant vehicle platform, such as passenger vehicles (ICE, HEV, BEV, PHEV, etc.), commercial vehicles, industrial vehicles, tracked vehicles, off-road and all-terrain vehicles (ATV), motorcycles, farm equipment, watercraft, aircraft, etc. Disclosed features may be most effective for, but are certainly not limited to, P2/P2.5/P3/P4 hybrid electric architectures (P2=E-machine on transmission input side; P2.5=E-machine on transmission; P3=E-machine on transmission output side; P4=E-machine direct connect to axle drive). In an example, a hybrid electric powertrain includes an internal combustion engine with a crankshaft attached to a flexplate, and one or more electric traction motors that operate independently or in conjunction with the engine. A torsional damper assembly includes multiple springs mounted to a damper plate, which is attached to the engine flexplate. An automatic transmission receives, modifies, and transmits torque generated by the engine and traction motor(s) to a final drive system. A hydrodynamic torque converter assembly connects the engine and traction motor(s) to the power transmission.

Continuing with the above example, the hybrid electric powertrain also includes an engine disconnect device located between the engine and power transmission. The engine disconnect device includes a first (positive) OWC with concentric inner and outer races and a plurality of torque transmitting elements interposed between and transferring torque across the inner and outer races in a first direction. The first outer race is rigidly attached (e.g., welded) to the torsional damper plate for common rotation therewith, and the first inner race is rigidly attached (e.g., riveted) to the pump cover of the TC assembly for common rotation therewith. A second (negative) OWC is coaxial with and circumscribed by the first OWC. The second OWC also includes respective inner and outer races with a respective plurality of torque transmitting elements interposed between and transferring torque across these races in a second direction. The second outer race is securely attached (e.g., splined) to the first inner race for common rotation with the first inner race and TC pump cover. The second inner race is rigidly attached to the torsional damper plate for common rotation therewith.

Other aspects of the disclosure are directed to methods for making and methods for using any of the disclosed engine disconnect devices, powertrains, and vehicles. In an example, a method is presented for assembling an engine disconnect device. This representative method includes, in any order and in any combination with any of the above and below disclosed options and features: providing a first one-way clutch (OWC) with first inner and outer races and a first plurality of torque elements interposed between and transferring torque across the first inner and outer races, the first outer (or inner) race being configured to attach to the torsional damper plate for common rotation therewith, and the first inner (or outer) race being configured to attach to the pump cover of the TC assembly for common rotation therewith; and, mounting a second OWC coaxial with the first OWC, the second OWC including second inner and outer races and a second plurality of torque elements interposed between and transferring torque across the second inner and outer races, the second outer (or inner) race being configured to attach to the pump cover for common rotation with the pump cover, and the second inner (or outer) race being configured to attach to the torsional damper plate for common rotation therewith.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIGS. 6-8 are schematic illustrations of the representative pawl-type SOWC engine disconnect device of FIG. 5 showing the selector plate drive a spring-biased wedge to shift a pawl-bearing notch plate insert seated inside a notch of the notch plate.

Figure 1:
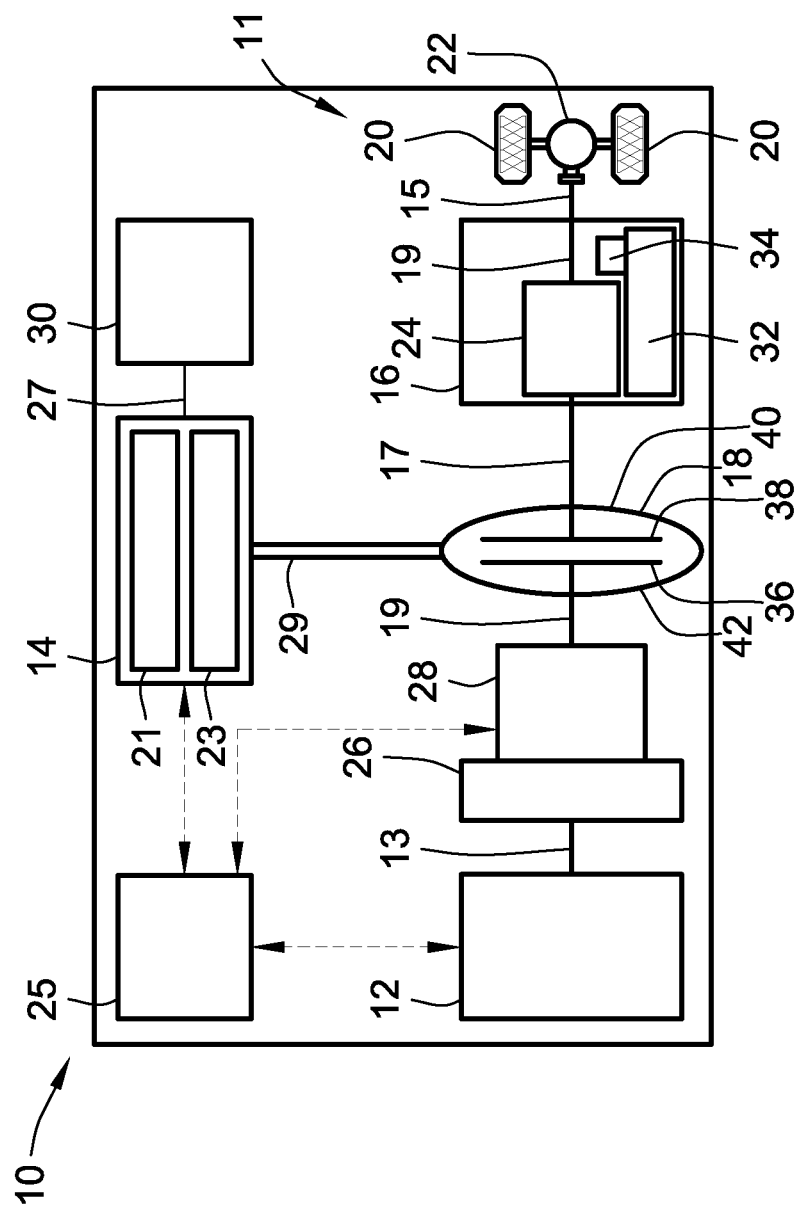
FIG. 1 is a schematic illustration of a representative electric-drive motor vehicle with a hybrid powertrain having an engine assembly drivingly connected to a multi-speed power transmission and an electric motor/generator unit by a SOWC engine disconnect device in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel P2 hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) assembly 18 to drive one or more road wheels 20 of the vehicle's final drive system 11. The illustrated automobile 10—also referred to herein as "motor vehicle" or "vehicle" for short—is merely an exemplary application with which novel aspects and features of this disclosure can be practiced. In the same vein, implementation of the present concepts into a P2 hybrid powertrain architecture should also be appreciated as an exemplary application of the novel concepts disclosed herein. As such, it will be understood that aspects and features of the present disclosure can be applied to other vehicle powertrain configurations and utilized for any logically relevant type of motor vehicle. Lastly, only select components have been shown and will be described in additional detail herein. Nevertheless, the vehicles, powertrains, and disconnect devices discussed below can include numerous additional and alternative features, and other available peripheral components, e.g., for carrying out the various methods and functions of this disclosure.

The representative vehicle powertrain system is shown in FIG. 1 with a prime mover, such as a restartable internal combustion engine (ICE) assembly 12, that is drivingly connected to a driveshaft 15 of a final drive system 11 by a multi-speed automatic power transmission 16. The engine 12 transfers power, preferably by way of torque via an engine crankshaft 13 (or "engine output member"), to an input side of the transmission 16. According to the illustrated example, the ICE assembly 12 rotates an engine-driven torsional damper assembly 26 and, through the torsional damper assembly 26, an engine disconnect device 28, as will be described in further detail hereinbelow. This engine disconnect device 28, when operatively engaged, transmits torque received from the ICE assembly 12 by way of the damper 26 to input structure of the TC assembly 18. The transmission 16, in turn, is adapted to receive, selectively manipulate, and distribute tractive power from the engine 12 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid, as well as a shared transmission pump 34 for sufficient hydraulic pressure to activate the elements of the transmission 16, TC assembly 18, and engine disconnect device 28.

The ICE assembly 12 operates to propel the vehicle 10 independently of the electric traction motor 14, e.g., in an "engine-only" operating mode, or in cooperation with the motor 14, e.g., in a "motor-boost" operating mode. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, etc.

FIG. 1 also depicts an electric motor/generator unit 14 or other suitable traction motor that operatively connects via a motor support hub 29 (or "motor output member") and torque converter 18 to an input shaft 17 (or "transmission input member") of the transmission 16. The motor/generator unit 14 may be directly coupled onto a TC input shaft or rigidly mounted to a housing portion of the torque converter 18. The electric motor/generator unit 14 is composed of an annular stator 21 circumscribing and concentric with a rotor 23. Electric power is provided to the stator 21 through electrical conductors or cables 27 that pass through the motor housing in suitable sealing and insulating feed-throughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including PS, P1, P3, and P4 hybrid powertrains, any of which may be adapted for an HEV, PHEV, range-extended hybrid vehicle, fuel-cell hybrid vehicle, etc.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as an 8-speed automatic transmission, the power transmission 16 may optionally take on other suitable configurations, including Continuously Variable Transmission (CVT) architectures, automated-manual transmissions, etc.

As indicated above, ECU 25 is constructed and programmed to govern, among other things, operation of the engine 12, motor 14, transmission 16, TC 18, and disconnect device 28. Control module, module, controller, control unit, electronic control unit, processor, and any permutations thereof may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines. Software, firmware, programs, instructions, routines, code, algorithms and similar terms may be used interchangeably and synonymously to mean any processor-executable instruction sets, including calibrations and look-up tables. The ECU 25 may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during vehicle use or operation. Alternatively, routines may be executed in response to occurrence of an event during operation of the vehicle 10.

Figure 2:
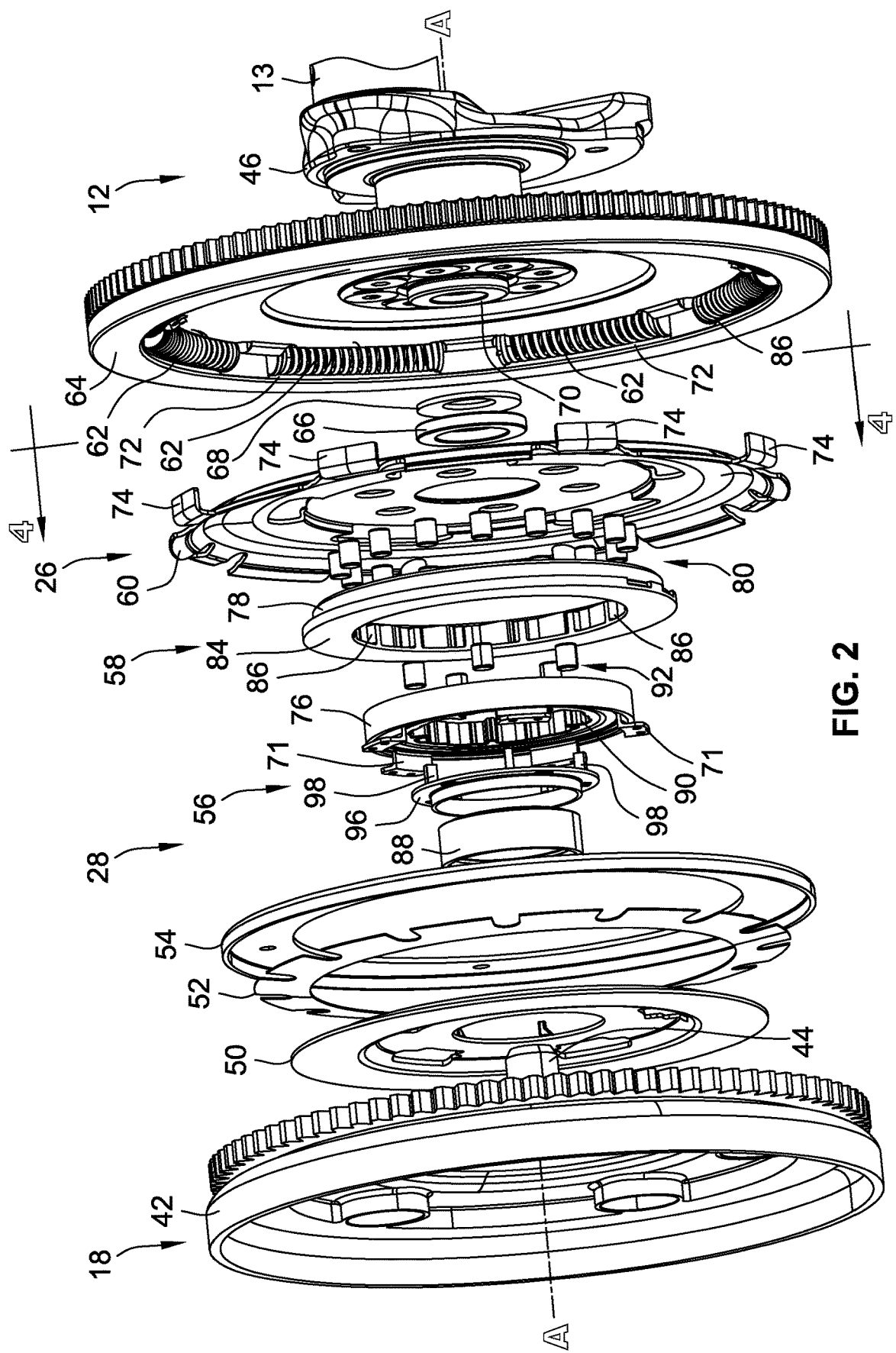
FIG. 2 is an exploded, perspective-view illustration of select portions of a representative hydrodynamic torque converter assembly, back-to-back SOWC engine disconnect device, engine flexplate, and torsional damper assembly in accordance with aspects of the present disclosure.

Hydrokinetic torque converter assembly 18 of FIGS. 1 and 2 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication with the turbine 38, with a stator (not shown) interposed between the impeller 36 and turbine 38 to selectively alter fluid flow therebetween. The transfer of engine torque from the crankshaft 13 to the transmission 16 via the TC assembly 18 is through stirring excitation of hydraulic fluid, such as transmission oil, inside the TC's internal fluid chamber caused by rotation of the turbine and impeller blades. To protect these components, the torque converter assembly 18 is constructed with a TC pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

Figure 3:
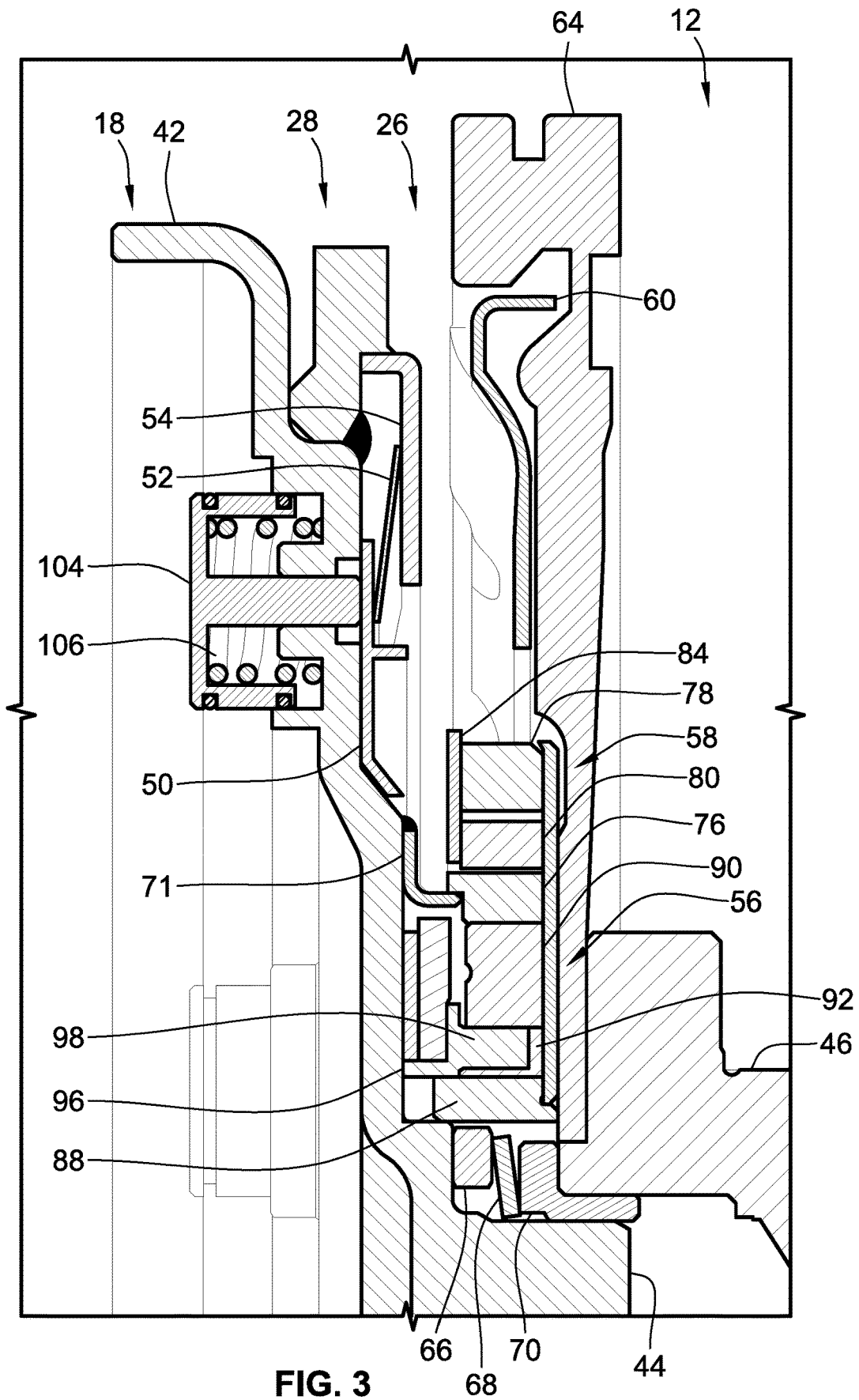
FIG. 3 is a cross-sectional side-view illustration of select components presented in FIG. 2.

FIG. 2 is an exploded, perspective-view illustration of select portions of the representative engine 12, TC assembly 18, torsional damper assembly 26, and engine disconnect device 28. Fundamentally, as the internal combustion engine 12 turns off to on, on to off, and operates at different rotational speeds during transient modes of powertrain operation, it may produce torque-related vibrations and oscillations (colloquially known as "torsionals"). By way of example, when fuel is being fed to the engine 12 and it is under power, e.g., through engagement of the fuel throttle (not shown herein) during normal operation, the engine 12 may produce torsionals that are undesirable to transmit to, and through, the transmission 16. Moreover, when fuel is not being fed to the engine 12 or the feed of fuel is discontinued, e.g., the engine 12 is in a startup and/or a shutdown operation, the engine pistons may generate compression pulses. Both the torsionals and compression pulses can produce resultant vibrations, noise, and rattle that may be sensed by a vehicle occupant. To reduce or otherwise cancel out torsionals, torque swings, and compression pulses that may be produced by the engine 12, the vehicle 10 is equipped with a torsional damper assembly 26 and an engine disconnect device 28, as shown in FIGS. 1-3. As will be described in detail below, the damper assembly 26 and disconnect device 28 help to isolate the torque converter 18 and, thus, the transmission 12 from unwanted torsionals generated by the engine 12, and also to selectively aide the motor/generator assembly 14 in canceling engine compression pulses during startup and shutdown operations.

According to the representative example illustrated in FIGS. 2 and 3, the engine disconnect device 28 is generally comprised of (from left-to-right in FIG. 2): a selector plate 50, a flex ring 52, a reaction ring 54, a negative (second) OWC 56, and a positive (first) OWC 58, all of which circumscribe a central hub 44 that is integrally formed with and projects from an exterior, engine-side surface of the pump cover 42. In the same vein, the damper assembly 26 of FIGS. 2 and 3 is generally comprised of a torsional damper plate 60 with one or more spring-mass damper systems ("SDS") 62 that operatively attach the damper plate 60 to a flexplate 64, all of which are supported on an engine hub 46 that is spline indexed to one end of the engine's crankshaft 13. The selector plate 50 is shown sitting flush against the engine-side surface of the pump cover 42, with the toroidal flex ring 52 compressed between the reaction ring 54 and selector plate 50. Reaction ring 54 is bolted or otherwise rigidly mounted to the pump cover 42 for rotation in unison therewith. The negative and positive OWCs 56, 58 are sandwiched between the selector plate 50 and damper plate 60, and both rotatably mounted onto the pump cover's central hub 44 around a thrust bearing 66 and Belleville washer 68 to rotate about axis A-A. As best seen in FIG. 3, the engine flexplate 64 is fabricated with a transmission-side cavity that nests therein the OWCs 56, 58 and damper plate 60. Damper assembly 26 is interposed between the flexplate 64 and engine disconnect device 28, with the flexplate 64 bolted directly to the engine hub 46 while the engine hub 46 is rotatably mounted onto the pump cover's central hub 44 via a high-speed needle bearing 70.

With continuing reference to FIG. 2, the series of SDSs 62 mates the torsional damper plate 60 and the negative and positive OWCs 56, 58 with the engine flexplate 64 such that the damper plate 60 and a respective race of each OWC 56, 58 rotate in unison with the flexplate 64 while allotted restricted rotational movement therebetween. In accord with the illustrated example, the flexplate 64 is fabricated with eight (8) half-cylinder-shaped spring receptacles 72 that are circumferentially spaced in an equidistant manner about the flexplate's body. While it is envisioned that any logically relevant type of spring element may be employed, the SDS 62 of FIG. 2 each includes a helical spring terminating at each end thereof with a spring retainer. Each SDS 62 is seated within a respective one of the spring receptacles 72 such that the lengths of the helical springs are elongated along the circumference of the flexplate 64. The representative torsional damper plate 60 is integrally formed with eight (8) circumferentially spaced, L-shaped spring tabs 74 that are radially aligned with the spring receptacles 72 in the flexplate 64. Each spring tab 74 projects into a gap between neighboring receptacles 72 and abuts a respective SDS 62. When the flexplate 64 rotates under the driving power of the engine assembly 12, the spring retainers of each SDS 62 are pressed against respective circumferentially spaced walls of the spring receptacles 72, thereby compressing the springs of the SDS 62 against the spring tabs 74. Once the SDS 62 are sufficiently compressed, torque from the crankshaft 13 is transmitted through the engine hub 46 and flexplate 64, and transferred through the SDS 62 to the damper plate 60. The allotted play between the damper plate 60 and flexplate 64 as governed by the SDS 62 helps to absorb and dampen unwanted torsionals produced by the engine 12 during startup, transient, and shutdown operations, as some non-limiting examples.

The vehicle powertrain is equipped with a "back-to-back" SOWC engine disconnect device 28 for drivingly connecting and disconnecting the ICE assembly 12 to/from the TC assembly 18 and, thus, the traction motor 14 and automatic transmission 16. As will be explained in further detail below, use of two concentrically aligned OWCs 56, 58 that are arranged in parallel power flow communication with each other to carry forward (positive) torque and reverse (negative) torque in opposite directions helps to create a "backlash free" engine disconnect device. In addition, one or both of the OWCs 56, 58 may be selectively turned off, i.e., to freewheel in both directions, in order to improve engine-disconnected, motor-only driving. For configurations in which the negative OWC 56 is selectively disengageable, positive engine torque may be momentarily applied to unload the negative OWC 56 in order to ease clutch disengagement. The back-to-back SOWC engine disconnect device 28 also mitigates resultant noise during transient vehicle operation and helps to improve engine disconnect response time during coasting and motor-only operating modes.

Figure 4:
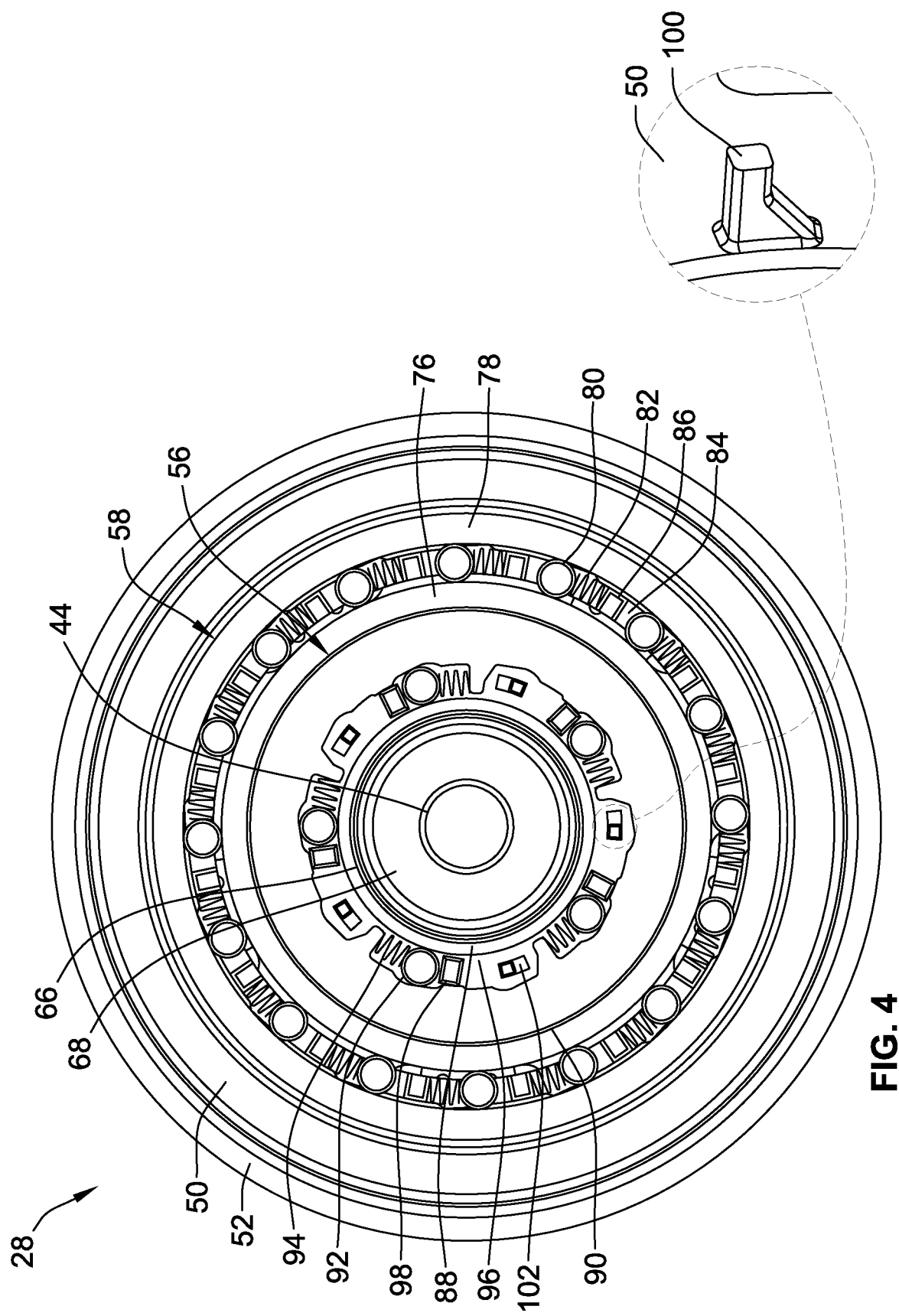
FIG. 4 is a front-view illustration of the representative back-to-back SOWC engine disconnect device of FIG. 2 as seen in the direction of section line arrows 4-4.

With reference to FIGS. 2-4, the positive (first) OWC 58 functions to automatically operatively connect (or "lock")

the crankshaft 13 by way of engine hub 46 to the TC pump cover 42 when a speed ratio therebetween is at or above a preset threshold speed ratio (e.g., positive torque is being transferred at approximately 0.98:1.00). Conversely, the positive OWC 58 functions to automatically operatively disconnect (or "overrun") the crankshaft 13 from the TC pump cover 42 when the speed ratio therebetween is below the aforementioned preset threshold speed ratio and/or when the torque reverses direction (e.g., to a negative torque). In the illustrated example, the positive OWC 58 includes a (first) annular inner race 76 that is concentrically aligned within a (first) annular outer race 78. The outer race 78 is bolted, riveted, welded, and/or integrally formed with (collectively "rigidly attached") the torsional damper plate 60 to rotate in unison therewith. Conversely, the inner race 76 is rigidly attached to the TC pump cover 42, e.g., via L-shaped mounting tabs 71, to rotate in unison therewith. Projecting axially and radially from the inner race 76, these mounting tabs 71 are circumferentially spaced from one another around a TC-side face of the positive OWC's inner race 76. Due to the large torque loads carried during forward driving, it may be desirable that the positive OWC 58 be larger than the negative OWC 56 such that the former circumscribes the latter, in accord with the illustrated example. It is envisioned, however, that the positive OWC 58 may be concentrically aligned within the negative OWC 56 for at least some powertrain applications.

Disposed between and selectively rotatably coupling the inner and outer races 76, 78 of the positive OWC 58 is a series of circumferentially spaced (first) torque transmitting elements 80. These torque transmitting elements 80 (or "torque elements" for brevity) are illustrated as sixteen (16) identically shaped and sized cylindrical rollers; alternative configurations may incorporate any number, type, and combination of torque elements, including cylindrical rollers, tapered rollers, needle rollers, sprags, etc. Torque transmitting elements 80 are portrayed in FIG. 4 as spring-biased rollers in which individual helical compression springs 82 (FIG. 4) bias the illustrated rollers to a disengaged position. When disengaged, the torque transmitting rollers 80 are in an "unwedged" state to allow overrunning rotational motion of the outer race 78 relative to the inner race 76 in one direction (e.g., counterclockwise in FIG. 4). A (first) roller cage 84, which is interposed between the selector plate 50 and OWC 58, includes axial projections 86 that press or otherwise "preload" the torque elements 80 to a "wedged" position and, concomitantly, an engaged state. In so doing, the two races 76, 78 are locked together to transmit (positive) torque from the flexplate 64 and torsional damper plate 60, across the outer race 78 and rollers 82, and through the inner race 76 to the TC pump cover 42.

Negative OWC 56 functions to automatically operatively connect (or "lock") the TC pump cover 42 to the engine hub 46 when torque is transmitted in the opposite direction from that of the positive OWC 58 and a corresponding speed ratio between the pump cover 42 and hub 46 is at or above a preset threshold speed ratio. On the other hand, the negative OWC 56 functions to automatically operatively disconnect (or "overrun") the pump cover 42 from the hub 46 when the speed ratio therebetween is below the aforementioned preset threshold speed ratio and/or when the torque reverses back to the positive direction. Similar to the positive OWC 58, the negative OWC 56 includes a (second) annular inner race 88 that is concentrically aligned within a (second) annular outer race 90. Both annular races 88, 90 of the negative OWC 56 are disposed radially inside of and are mutually coaxial with both annular races 76, 78 of the positive OWC 58. The negative OWC inner race 88 is bolted, riveted, welded, and/or integrally formed with the torsional damper plate 60 to rotate in unison therewith. Conversely, the negative OWC outer race 90 is operatively attached, e.g., via splined engagement, to the positive OWC inner race 76 to rotate in unison therewith. Through this engagement with the inner race 76, outer race 90 is securely attached to the TC pump cover 42 to rotate in unison therewith.

A series of circumferentially spaced (second) torque transmitting elements 92 is disposed between and rotatably couples the inner and outer races 88, 90 of the negative OWC 56. These torque transmitting elements 92 (also referred to herein as "torque elements" for brevity) are illustrated in FIGS. 2 and 4 as five (5) identically shaped and sized cylindrical rollers. It is desirable, for at least some applications, that both OWCs 56, 58 employ roller-type torque transmitting elements. However, torque elements 80, 92 may take on any structure suitable for transmitting torque between complementary races of a one-way clutching device. Torque transmitting elements 92 are portrayed in FIG. 4 as spring-biased torque elements in which individual helical compression springs 94 (FIG. 4) bias the illustrated rollers 92 to a disengaged position. When disengaged, the rollers 92 are in an "unwedged" state to allow overrunning rotational motion of the inner race 88 relative to the outer race 90 in one direction (e.g., clockwise in FIG. 4). A (second) roller cage 96, which is interposed between the selector plate 50 and OWC 56, includes axial projections 98 that press or otherwise "preload" the torque elements 92 to a "wedged" position and, concomitantly, a torque-transmitting engaged state. In so doing, the two races 88, 90 are locked together to transmit (negative) torque from the pump cover 42 of the TC assembly 18, across the negative OWC outer race 90 and rollers 92, and through the inner race 88 to the torsional damper plate 60.

Selector plate 50 may be selectively actuable, e.g., via ECU 25 responsive to a transient vehicle operation, to move back-and-forth along a rectilinear path to transition between deactivated and activated states. When activated, this selector plate 50 switches one or both OWCs 56, 58 from a torque-carrying (locked) state to a non-torque-carrying (freewheeling) state. Conversely, deactivating the selector plate 50 will switch one or both of the OWCs 56, 58 from a non-torque-carrying state to a torque-carrying state. In accord with the illustrated example, selector plate 50 slides axially, e.g., from left-to-right in FIGS. 2 and 3 on a path parallel to axis A-A, from a deactivated state to an activated state. The deactivated selector plate 50 seats flush against the TC pump cover 42 and operatively disengages the roller cage 96. Activating the selector plate 50 displaces it away from the pump cover 42 such that the plate 50 rotates the negative OWC roller cage 96 from an engaged state to a disengaged state. Rotating the roller cage 96 in this manner disengages the axial projections 98 from the torque transmitting rollers 92 and concomitantly frees these torque elements 92 to shift to non-torque-transmitting positions under the biasing forces of compression springs 94.

To convert the translational motion of the selector plate 50 into the rotational motion of the roller cage 96, the representative selector plate 50 is integrally formed with or otherwise fabricated to include a series of ramped shanks 100 (see inset view of FIG. 4). These ramped shanks 100 are circumferentially spaced in an equidistant manner about, and project axially from the selector plate's engine-side surface. The negative OWC's roller cage 96 is formed with a series of circumferentially spaced windows 102, each of which is shaped, sized and located to receive therethrough a respective one of the ramped shanks 100. Sliding the selector plate 50 from the deactivated position to the activated position will contemporaneously slide each ramped shank 100 against the inner perimeter of its corresponding window 102. The axially angled contact surfaces of the shanks 100 apply a moment force to the roller cage 96 via windows 102 to rotate the roller cage 96 to the disengaged state. Shifting the select plate 50 back to the deactivated position, as described below, will operatively disengage the ramped shanks 100 from the windows 102, allowing the roller cage 96 to rotate back to the engaged state and, thus, push the torque elements 92 to their wedged positions.

Back-to-back SOWC engine disconnect device 28 employs hydraulically actuated, spring-loaded pistons 104 (one of which is shown in FIG. 3) to move the selector plate 50 to the activated state. According to the illustrated example, five (5) spring-loaded pistons 104 are circumferentially spaced in an equidistant manner around the pump cover 42 of the TC assembly 42. As shown, each piston 104 is slidably mounted in a sealing fashion to TC assembly 18, passing at least partially through the pump cover 42. When the hydraulic pressure inside the internal fluid chamber of the TC assembly 18 exceeds the spring force of return springs 106, the pistons 104 stroke, e.g., left-to-right in FIG. 2, and push the selector plate 50 from the deactivated state to the activated state. When this internal hydraulic pressure is relieved, return springs 106 bias the pistons to a deactuated position; at the same time, toroidal flex ring 52 presses against and biases the selector plate 50 to the deactivated state. Annular reaction ring 54, which circumscribes the selector plate 50 and flex ring 52, provides a reaction surface against which the flex ring 52 presses.

Figure 5:
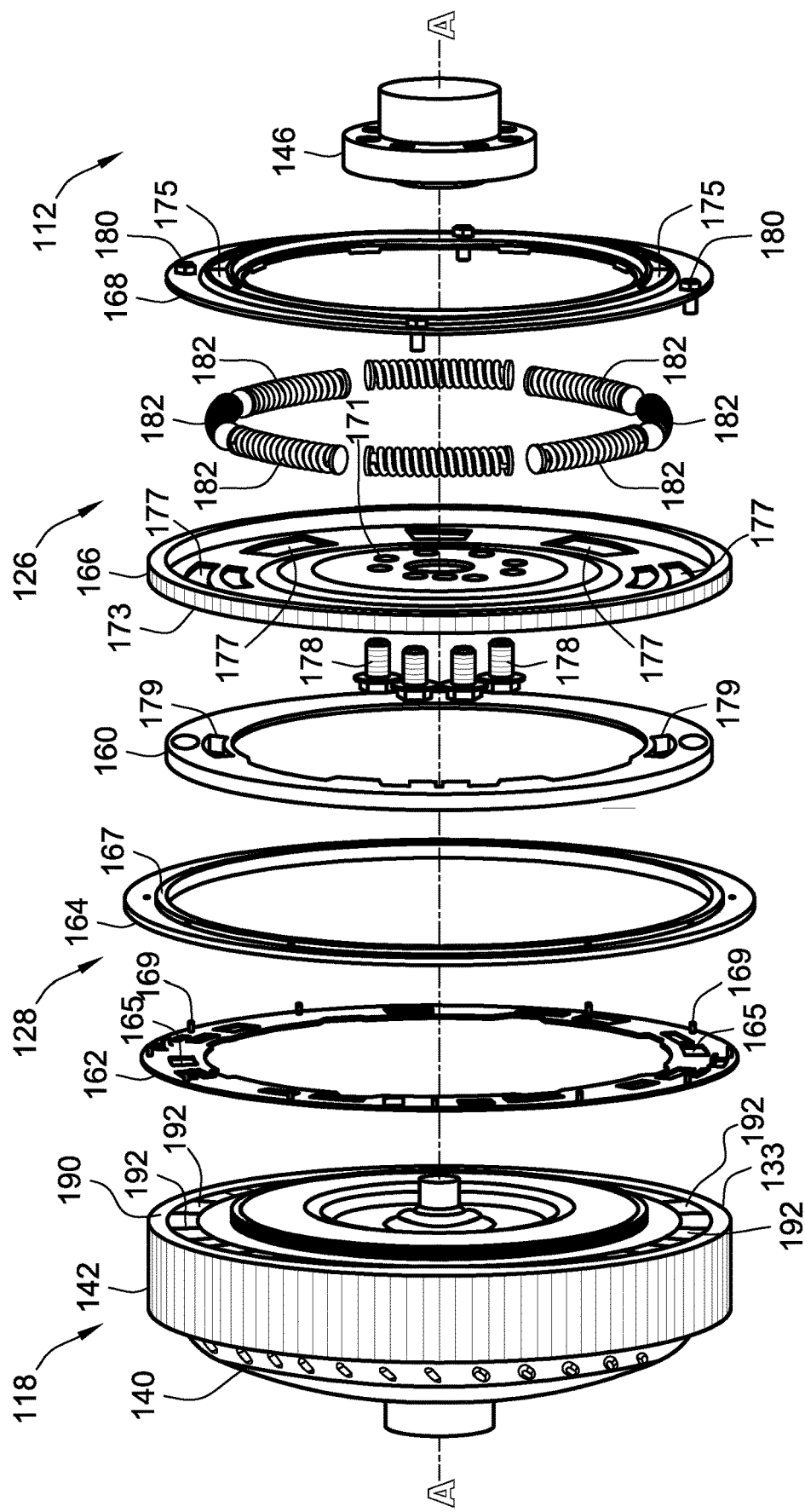
FIG. 5 is an exploded, perspective-view illustration of select portions of a representative hydrodynamic torque converter assembly, pawl-type SOWC engine disconnect device, engine flexplate, and torsional damper assembly in accordance with aspects of the present disclosure.

Another representative engine disconnect device 128 is presented in FIG. 5 and portrayed for purposes of discussion as a positive-engagement, pawl-type SOWC assembly. Although differing in appearance, it is envisioned that any of the features and options set forth above with reference to the engines, torque converters, damper assemblies and disconnect devices of FIGS. 1-4 can be incorporated, singly or in any combination, into the corresponding components discussed below with respect to FIGS. 5-14, and vice versa. Similar to the torque converter 18 of FIGS. 1 and 2, for example, the TC assembly 118 of FIG. 5 is a hydrodynamic engine-to-transmission drive coupling that includes a TC pump housing, which may generally comprise a transmission-side pump shell 140 that is fixedly attached to an engine-side pump cover 142 such that a working hydraulic fluid chamber is formed therebetween. As another example, an engine hub 146 of FIG. 5 is spline indexed to one end of an engine output shaft, such as crankshaft 13 of FIGS. 1 and 2, with an axially-flexible engine flexplate 166 bolted directly to the engine hub 146.

Figure 8:
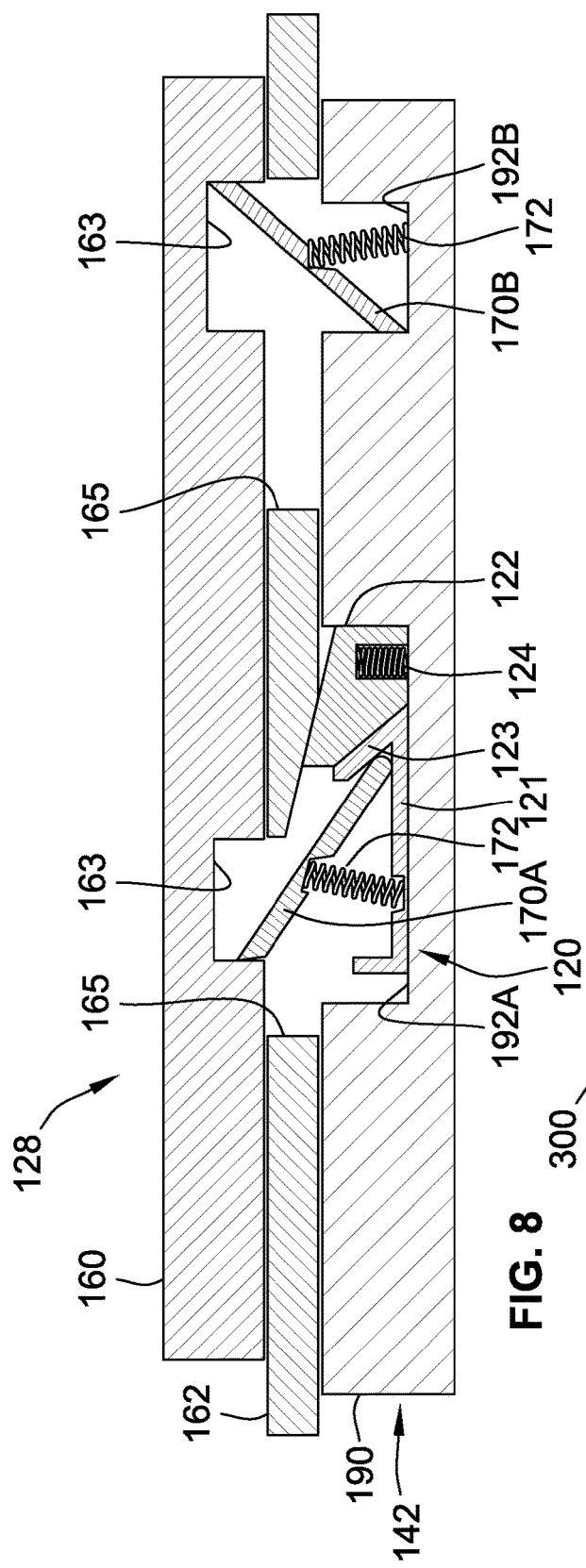

Engine disconnect device 128 of FIG. 5 includes an annular pocket plate 160 that is fabricated with a succession of circumferentially spaced pockets 163 (FIGS. 6-8). These pockets 163 may have an elongated, polyhedral shape, each of which is recessed into a transmission-side surface of the pocket plate 160. Each pocket 163 is shaped and sized to receive therein a respective torque-transmitting engaging element 170A, 170B (FIGS. 6-8) that functions to engage a pocket 163 of the pocket plate 160 with a notch 192 in a notch plate 190. In the illustrated example, the notch plate 190 is integrally formed as a single-piece structure with the pump cover 142 of the torque converter 118; alternative designs may include a notch plate 190 that is formed as a separate part that is subsequently mounted onto and drivingly connected with the TC assembly 118. When the engaging elements 170A, 170B project into and abut both the pockets 163 and notches 192, as seen in FIG. 8, they cooperatively lock the pocket plate 160 to the notch plate 190 such that the two rotate in unison in both forward and reverse directions. Conversely, when one set of engaging elements 170A—represented herein as negative-torque-transmitting pawls—are withdrawn into their respective notches 192A, as seen in FIG. 6, the pocket plate 160 is allowed to rotate with respect to the notch plate 190 in one direction (rightward in FIG. 6).

According to the representative architecture of FIGS. 5-8, each engaging element 170A, 170B is composed of a spring-biased pawl that is rotatably seated within a respective one of the aforementioned notches 192A, 192B. These pawls may have a generally rectangular plan profile with beveled engaging ends. It is also envisioned that the engaging element 170A, 170B take on other forms, including sprags, struts, etc. Each pawl 170A, 170B is provided with a dedicated biasing member 172, which may be a torsion spring, a coil spring, a constant force spring, or any other element capable of providing lift to one end of a torque-transmitting engaging element. While shown mounted within the notches 192 of the notch plate 190, it is envisioned that the engaging element 170A, 170B may be similarly packaged within the pockets 163 of the pocket plate 160.

With reference again to FIG. 5, the notch plate 190 may generally consist of circumferentially spaced notches 192 that are individually recessed into the engine-side surface of the front pump cover's flange portion 133. This series of notches 192 is radially aligned with the pockets 163 in the pocket plate 160, each shaped and sized to receive therein a pawl 170A, 170B. Distal ends of the pawls 170A, 170B engage the pockets 163—thereby locking the pocket plate 160 to the pump cover 142 for common rotation therewith—by protruding forward into (e.g., to the right in FIG. 5) and pressing against the pockets 163. Conversely, one or both sets of the pawls 170A, 170B may selectively disengage from the pocket plate 160—thereby unlocking the pocket plate 160 from the pump cover 142 to freewheel thereon—by receding into their respective notches 192 out of contact with the pockets 163. It will be apparent that the number, arrangement, and geometry of the engaging elements 170A, 170B, including their corresponding pockets 163 and notches 192, can be varied from that which are shown in the drawings depending, for example, on design requirements for the intended application.

To govern the operating status of the engine disconnect device 128 and, thus, the torque-transmitting mechanical coupling between the engine assembly 112 and torque converter 118, the disconnect device 128 is provided with a selector plate 162 and selector ring 164 that cooperatively control the engagement and disengagement of one or both sets of pawls 170A, 170B. Selector plate 162 is a disk-shaped annulus that neighbors the pocket plate 160 and is coaxially aligned with the torque converter 118 and damper assembly 126 to rotate about axis A-A of FIG. 5. As shown, the selector plate 162 is mounted for rotational movement relative to the pocket and notch plates 160, 190 to transition back-and-forth between engaged and disengaged positions. When the selector plate 162 is in its engaged position, as best seen in FIG. 8, both sets of engaging elements 170A, 170B are allowed to shift into engagement with the notches 192 of the notch plate 190, e.g., under the biasing force of the biasing members 172. By way of example, and not limitation, the selector plate 162 is machined with a series of circumferentially spaced windows 165, each of which is shaped and sized to receive therethrough a portion of a single pawl 170A, 170B. Moving the selector plate 162 to the engaged position aligns the windows 165 with corresponding notches 192 such that the pawls 170A, 170B seated therein project through the windows 165 and into the pockets 163 of the pocket plate 160. On the other hand, when the selector plate 162 rotates (e.g., counterclockwise in FIG. 5) to its disengaged position, as best seen in FIG. 6, the plate 162 shifts the negative-torque-transmitting engaging elements 170A out of engagement with the pocket plate 160.

The selector ring 164 of FIG. 5 is a disc-shaped component with a centrally located cylindrical hub 167 that is sized to circumscribe and seat therein the SOWC pocket plate 160. When the engine disconnect device 128 is fully assembled, an aft-facing, transmission-side surface of the selector ring 164 sits generally flush against a forward-facing, engine-side surface of the selector plate 162, while an inner-diameter surface of the central hub 167 sits generally flush with an outer periphery surface of the pocket plate 160. Circumferentially spaced tabs 169 project from the selector plate 162 into complementary slots in the selector ring 164 to operatively interconnect the two components such that they rotate in unison with each other. A selectively engageable brake mechanism (not shown) is activated by a vehicle controller, such as ECU 25 of FIG. 1, to restrict rotational motion of the selector ring 164 about axis A-A. In so doing, the ring 164 is selectively transitioned back-and-forth from between deactivated and activated positions to thereby move the selector plate 162 between the engaged and disengaged positions, respectively.

With continuing reference to FIG. 5, the engine flexplate 166 is located immediately adjacent and sandwiched between the pocket and damper plates 160, 168. Flexplate 166 mechanically attaches the damper assembly 126 and, indirectly, the engine disconnect device 128 to the torque-transmitting output of the engine assembly 112. Machined into the flexplate 166 is a circular array of circumferentially spaced fastener holes 171. As seen in FIG. 5, these fastener holes 171 receive therethrough threaded bolts 178 or other suitable fasteners that threadably mate with complementary internally threaded female holes in the engine hub 146 to thereby rigidly couple the flexplate 166 directly to the engine hub 146 to rotate in unison with the engine output shaft. Flexplate 166 drivingly connects the damper assembly 126, disconnect device 128 and, when desired, the torque converter assembly 118 to the engine 112—by way of engine hub 146—such that rotational power is transferable back-and-forth therebetween. In addition to operating to transmit torque produced by the engine 112 to the transmission (e.g., transmission 16 of FIG. 1), the flexplate 166 may also function to absorb thrust loads that may be generated by the engine's reciprocating pistons and/or the torque converter's hydrodynamic activities. Projecting radially outward from an outer diameter (OD) edge of the flexplate body is a succession of gear teeth 173—collectively defining a "starter ring gear"—that operatively engage with gear teeth of an engine starter.

A ring-shaped damper plate 168, which sits generally flush against an engine-side surface of the flexplate 166, circumscribed by the starter ring gear teeth 173, is fixedly attached, e.g., via hexagonal bolts 180 or other suitable fasteners, to the pocket plate 160 for common rotation therewith. In any of the instances in this disclosure where bolts or threaded fasteners are disclosed as a mechanism for connecting two or more components, it should be recognized that other processes may be employed to join those components, such as riveting, welding, forming, etc. Damper plate 168 is shown interposed between and, thus, sandwiched by the engine assembly 112 and the flexplate 166. The damper plate 168 of FIGS. 2 and 3 is also equipped with one or more spring-mass damper systems, also referred to herein as "SDS" and identified as 182 in the drawings. These SDS 182 are shown spaced circumferentially around and positioned proximate to the outer periphery of the damper plate 168.

The SDS 182 mate the damper plate 168 and pocket plate 160 with the flexplate 166 such that the pocket and damper plates 160, 168 are movably attached to the flexplate 166. In accord with the illustrated example, the damper plate 168 is fabricated with half-cylinder-shaped spring receptacles 175 that are equidistantly spaced about the damper plate's circumference. While it is envisioned that any logically relevant type of spring element may be employed, the SDS 182 of FIG. 5 each includes a helical spring terminating at each end thereof with a spring retainer. Each SDS 182 seats within a respective one of the spring receptacles 175 such that the length of each helical spring is elongated along the circumference of the plate 168. Defined through the body of the flexplate 166 are circumferentially spaced spring windows 177, each of which receives therethrough a respective one of the SDS helical springs. To this regard, the pocket plate 160 is formed with circumferentially spaced spring channels 179 that correspond in number and are radially aligned with the spring windows 177 in the flexplate 166 and the spring receptacles 175 in the damper plate 168. With this arrangement, the helical springs of the SDS 182 nest within the channels 179, sandwiched between the pocket and damper plates 160, 168. When the flexplate 166 rotates under the driving power of the engine assembly 112, the spring retainers of each SDS 182 are pressed against respective circumferentially spaced walls of the spring windows 177, thereby compressing the springs. This interaction can be used to absorb and dampen unwanted torsionals produced by the engine 112 during normal, startup, transient and shutdown operations, as some non-limiting examples.

Turning next to FIG. 6, the SOWC notch plate 190 of disconnect device 128 is shown with multiple "floating" notch plate inserts 120 that are nested within some or all of the notches 192 and supporting thereon some or all of the pawls 170A, 170B. In accord with the illustrated example, the notch plate insert 120 may be integrally formed as a unitary, single-piece structure with a base 121 and a ramped wall 123 projecting from one end of the base 121. An inboard facing, transmission-side surface of the base 121 slides against an outboard-facing, engine-side surface of a discrete notch 192A. Conversely, an outboard surface of the base 121 provides subjacent support for a negative-torque-carrying pawl 170A and its corresponding bias spring 172. Acting as a pivot point, a fixed, proximal end of the pawl 170A abuts the base 121 of the notch plate insert 120; the spring 172 operates to bias a moving, distal end of the pawl 170A to pivot away from the base 121, through the selector plate 162, and into the pocket plate 160. For embodiments in which notch plate inserts 120 are only provided for select engaging elements (e.g., only the negative-torque carrying pawls 170A in FIGS. 6-8), the notches 192A for those select pawls 170A may be larger in depth, width, and/or length than their counterpart notches 192B for the positive-torque carrying pawls 170B to provide additional packaging space for the notch plate inserts 120. In this regard, the pawls 170A may be slightly shorter in length than the pawls 170B to accommodate the notch plate inserts 120.

Reciprocally mounted within each of the notches 192A of FIGS. 6-8, adjacent the notch plate inserts 120 and the pawls 170A borne thereby, is a spring-biased wedge insert 122. While an assortment of shapes and sizes are envisioned, these wedge inserts 122 are shown as unitary, single-piece structures with a non-regular polygonal cross-section. Wedge springs 124 are also mounted within the notches 192A, each of which is sandwiched between the notch plate 190 and an individual wedge insert 122. Portrayed in a representative example as helical compression springs, these wedge springs 124 bias the wedge inserts 122 axially out of their respective notches 192A (e.g., upward in FIGS. 6-8; rightward in FIG. 5). Each wedge insert 122 includes a ramped surface 125 that abuts and sits generally flush against the ramped wall 123 of the notch plate insert 120. As seen in FIG. 6, both the ramped wall 123 and ramped surface 125 are obliquely angled with respect to the outboard-facing notch surface against which is seated and slides the notch plate insert 120. Each wedge insert 122 is also fabricated with a ramped engine-side face 127 that adjoins and is obliquely angled with respect to the ramped surface 125. Complementary to the ramped faces 127 of the inserts 122 are ramped edges 161 located along trailing sides of the selector plate windows 165. As will be explained further below, movement of the selector plate 162 to the engaged (second) position will slide the ramped edges 161 of the selector plate windows 165 against the ramped faces 127 of the wedge inserts 122. Angling the points of contact between the wedge inserts 122 and selector plate 162—edges 161 and faces 127 of FIG. 6 are obliquely angled with respect to the trajectory of the moving selector plate 162—will generate a generally axial force vector that projects inboard and pushes the wedge inserts 122 axially into the notches 192A.

In the sequence of illustrations presented in FIGS. 6-8, the notch plate inserts 120 slide left-to-right, and back again, between a vacating location (e.g., a first, rightmost position in FIG. 6) and a filling location (e.g., a second, leftmost position in FIG. 8) to take-up any backlash space within the notches 192 during engagement of the pawls 170A. As indicated above, the selector plate 162 rotates back-and-forth about axis A-A between a disengaged position—shifting the engaging elements 170A out of engagement with the pockets 163 (FIG. 6)—and an engaged position—allowing the engaging elements 170A to shift into engagement between the pockets 163 and notches 192A (FIG. 8). When moved to the engaged position (e.g., to the left in FIG. 7), the selector plate 162 concomitantly presses the wedge inserts 122 (e.g., downward in FIG. 7) against the notch plate inserts 120. As the force applied by the selector plate 162 to the wedge inserts 122, e.g., via ramped window edges 161 sliding against ramped insert faces 127, overcomes the bias force of the wedge springs 124, the wedge inserts 122 translate along a generally rectilinear path that is orthogonal to the path of the selector plate. As a result, the wedge inserts 122 slide their respective ramped surfaces 125 against the ramped walls 123 of their corresponding notch plate insert 120. This force, in turn, pushes the notch plate inserts 120 along a generally rectilinear, yet circumferential path with respect to the notch plate 190 to the backlash-space filling (second) location in FIG. 8. It may be desirable, for at least some embodiments, that the wedge inserts 122 slide, e.g., up-and-down in FIGS. 6-8, against an adjacent end wall of the notch 192.

Figure 10:
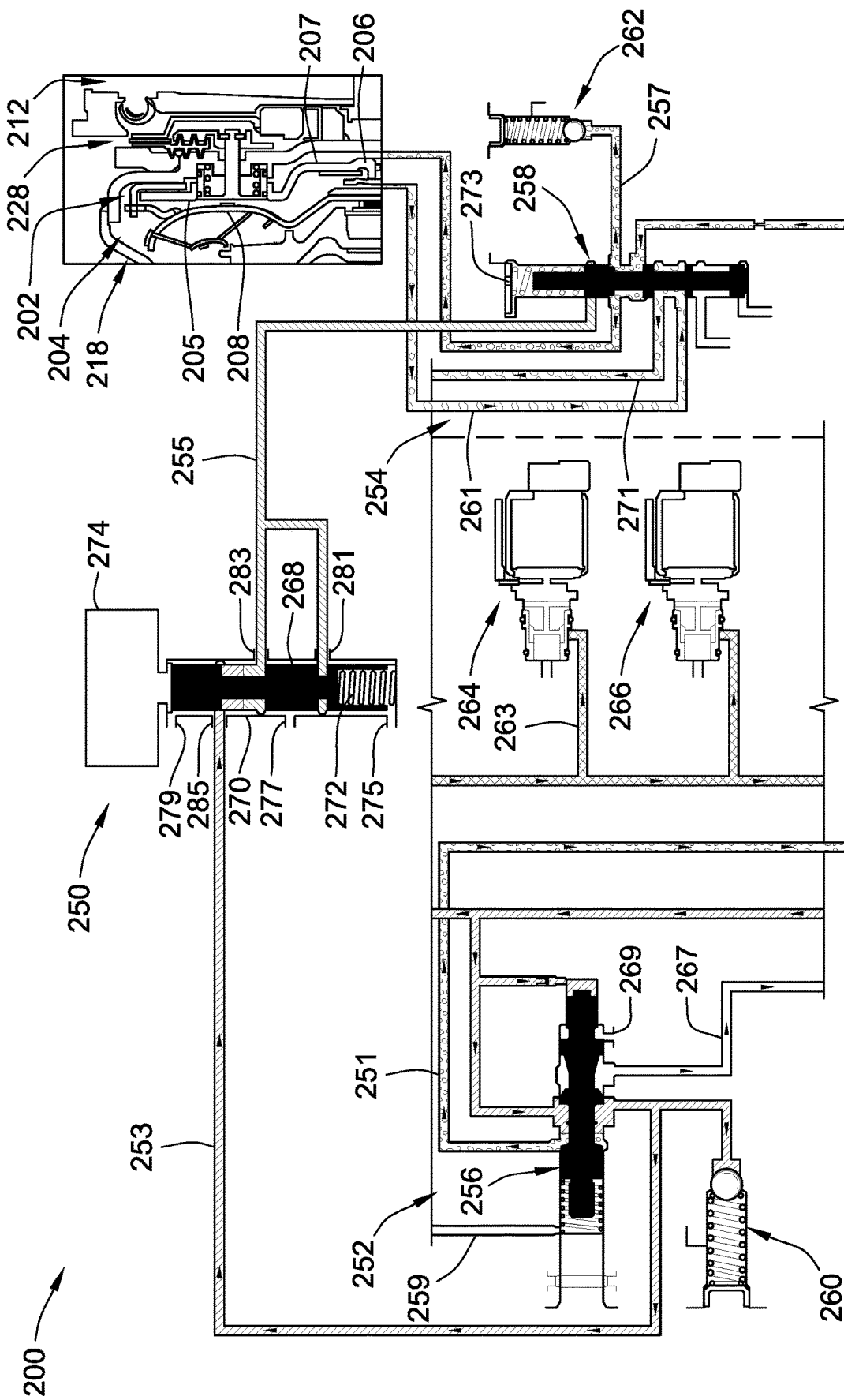
FIG. 10 is a schematic illustration of a representative hydraulic circuit for activating and deactivating a TCC and EDC using TCC apply and release pressures in accordance with aspects of the present disclosure.

FIG. 10 illustrates a representative hydraulic control circuit 200 for activating and deactivating both a representative torque converter clutch (TCC) assembly 202 of a TC assembly 218 and a representative selectable one-way engine disconnect clutch (EDC) assembly 228 using apply-side and release-side pressures of the TCC assembly 202. Hydraulic control circuit 200 utilizes a solenoid-actuated torque converter and transmission (TCT) valve assembly 250 that is designed to use an absolute apply pressure of a TCC circuit to control the selective engagement and disengagement of the EDC assembly 228, while a relative pressure between a TCC apply pressure and a TCC release pressure controls the selective engagement and disengagement of the TCC assembly 202. The hydraulic control circuit 200 allows for control of both the TCC and EDC assemblies 202, 228 using a TC feed circuit 252 and a TCC feed circuit 254 without utilizing additional pressurized hydraulic circuits and attendant hardware dedicated to governing the EDC assembly 228.

Figure 9:
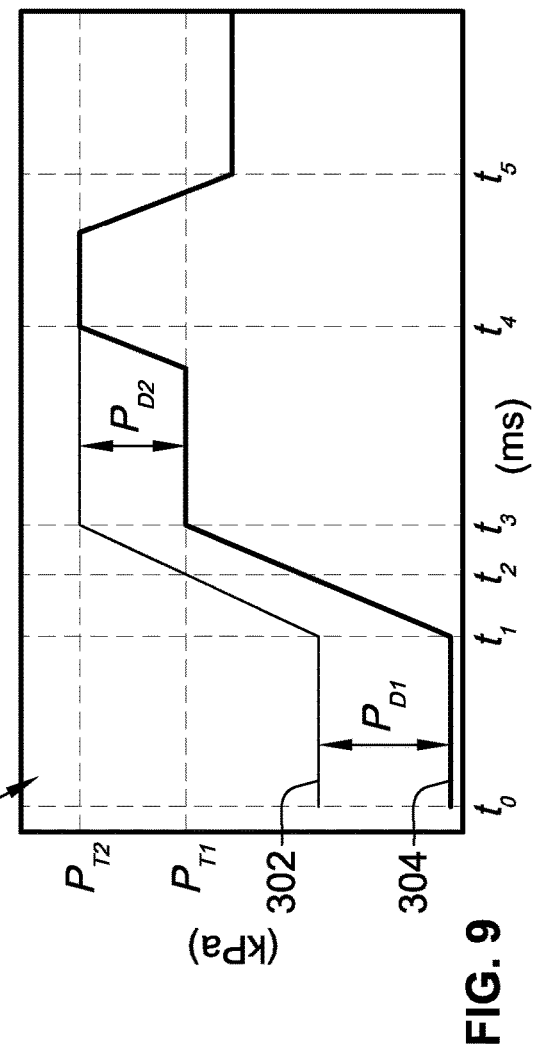
FIG. 9 is a graph of hydraulic pressure vs. time for a representative TC internal fluid chamber illustrating use of torque converter clutch (TCC) apply and release pressures for the activation and deactivation of a TCC and an engine disconnect clutch (EDC).

As a point of reference during the discussion of the hydraulic circuit architecture of FIG. 10, FIG. 9 presents a graph 300 of hydraulic pressure (kilopascals (kPa)) versus time (milliseconds (ms)) for the internal fluid chamber 204 of the TC assembly 218. A first plot 302 in graph 300 is indicative of TCC apply pressure on the TCC assembly 202, namely a measured hydraulic pressure on an apply face 205 of a TCC friction plate 206 that is facing a turbine shell 208 of the TC assembly 218. Likewise, a second plot 304 in graph 300 of FIG. 9 is indicative of TCC release pressure on the TCC assembly 202, namely a measured hydraulic pressure on a release face 207 of the TCC friction plate 206 that is facing the pump cover of the TC assembly 218. While the TC assembly 218 is provided purely as a representative application of the concepts presented in FIGS. 9-11, the twin-faced TCC friction plate 206 in the inset view of FIG. 10 may be desirable for increased clutch gain. Moreover, it should be appreciated that the graph 300 is provided purely for purposes of clarification, and is therefore non-limiting in nature.

From an initiation time marker to $t_0$ a first time marker $t_1$, a first pressure difference $P_{D1}$ between the TCC apply and release pressures 302, 304 is roughly equal to a calibrated activation pressure differential such that the TCC assembly 202 carries torque, but is at or beyond a threshold of "slipping." For this same timeframe, the EDC assembly 228 may be under positive power while the control system slips the TCC assembly 202. The EDC assembly 228 may be normally engaged to enable the transfer of torque in both positive and negative directions and, thus, facilitate motor-assisted engine starts using an electric traction motor, such as MGU 14 of FIG. 1. Subsequent to second time marker $t_2$, i.e., during the transition from $t_1$ to third time marker $t_3$, an absolute value of the TCC release pressure 304 achieves a first calibrated pressure threshold $P_{T1}$ (e.g., 700 kPa); at this pressure the EDC assembly 228 is disengaged or "opened" such that torque is transferable, e.g., in only a single (positive) direction. At time $t_3$, there remains sufficient pressure difference across the TCC assembly 202 so that it continues to carry torque.

The absolute value of the TCC apply pressure 302 has reached a second calibrated pressure threshold $P_{T2}$ (e.g., 900 kPa) at time marker $t_3$. At this juncture, the TCC assembly 202 has adequate torque carrying capacity to carry a predetermined minimum torque (e.g., 150 Newton-meters (Nm)); the EDC assembly 228 remains open from time marker $t_3$ to $t_4$, e.g., to facilitate motor-only "EV driving." An optional auxiliary pump (not shown) may be included to enable motor-only, EV driving from zero vehicle speed. At a fourth time marker $t_4$, the relative pressure between the TCC apply and release pressures 302, 304 drops to zero. As a result, the TCC assembly 202 is slipped and opens such that the TC assembly 218 unlocks, e.g., in preparation for an engine reconnect operation. Charge pressure is thereafter released to bring the absolute value of the TCC apply pressure 302 down below the first calibrated pressure threshold $P_{T1}$ at a fifth time marker $t_5$. In so doing, the EDC assembly 228 is reengaged to carry torque in opposing forward and reverse directions.

Turning back to the hydraulic control circuit 200 of FIG. 10, the TC feed circuit 252 includes a spring-biased, hydraulically-actuated line pressure regulator valve 256 that is fluidly coupled via a TC feed line 251 to a spring-biased, hydraulically-actuated TCC control valve 258 of the TCC feed circuit 254. Line pressure regulator valve 256 is fluidly downstream from and connected to the TCT valve assembly 250 via blowoff line 253. This blowoff line 253 also fluidly connects the line pressure regulator valve 256 and TCT valve assembly 250 to a pump (line pressure) "blowoff" ball valve 260. In this regard, TCC control valve 258 is fluidly upstream from and connected to the TCT valve 250 via exhaust line 255. A TCC release line 257 fluidly connects the TCC control valve 258 to a TCC "blowoff" ball valve 262 and to the release side of the TCC assembly 202. During system operation, valve assembly 250 may be opened at time $t_1$ and controlled to provide regulated pressure to the release circuit through time $t_5$. Once the torque converter is fully opened at time $t_1$ and charge pressure is lowered to normal levels, the TCC control valve 258 may be switched such that the valve 250 is bypassed and the torque converter transitions into an "open" mode.

Activation of the line pressure regulator valve 256 is controlled, in part, via feeds of hydraulic fluid received from a pressure control solenoid (PCS) line 259 and from the blowoff line 253. In this regard, activation of the TCC control valve 258 is controlled, in part, via feeds of hydraulic fluid received from a TCC apply line 261 and the TC feed line 251. TCC apply line 261 also fluidly connects the TCC control valve 258 to the apply side of the TCC assembly 202. First and second normally-off pressure control solenoids 264 and 266, respectively, govern hydraulic pressure in an actuator feed limiting line 263. The line pressure regulator valve 256 is also provided with a suction line 267 and an exhaust port 269. In addition, TCC control valve 258 is provided with a cooler feed line 271 and an exhaust port 273.

With continuing reference to FIG. 10, the TCT valve assembly 250 includes a valve stem 268 that is slidably mounted inside a valve body 270 and is biased at one end thereof by a helical valve spring 272 or similarly suitable biasing member. At the opposite end of the valve body 270 from the valve spring 272 is an electronic linear-force (LFS) solenoid 274 that operates as a direct electric shift control for the valve stem 268. The valve body 270 is also provided with three exhaust ports: a first exhaust port 275 at a distal end of the valve body 270 inline with a spring chamber within which is packaged the valve spring 272; a second exhaust port 277 interposed between first and second release ports 281 and 283, respectively, of the valve body 270; and a third exhaust port 279 at a proximal end of the valve body 270, opposite the first exhaust port 275, and inline with a solenoid chamber of the LFS solenoid 274. The first release port 281 is interposed between the first and second exhaust ports 275, 277 relative to the valve body 270, whereas the second release port 283 is interposed between the second and third exhaust ports 277, 279 relative to the valve body 270. A blowoff line port 285 is inline with the second release port 283 and, thus, interposed between the second and third exhaust ports 277, 279 relative to the valve body 270.

Rectilinear movement of the valve stem 268 between longitudinal ends of the valve body 270 will govern the transfer of hydraulic fluid received from the TCC control valve 258, through the exhaust line 255, and into the valve body 270 via first and second release ports 281, 283. Valve stem 268 movement also governs the transfer of hydraulic fluid from the second release port 283, through the valve body 270, out the blowoff line port 285 and to the line pressure regulator valve 256 via blowoff line 253. The TCT valve assembly 250 is activated by the TCC mode control valve 258. When the torque converter is in a "closed" configuration, the valve assembly 250 may be activated and selectively used to open or close both the TCC and EDCs.

Figure 11:
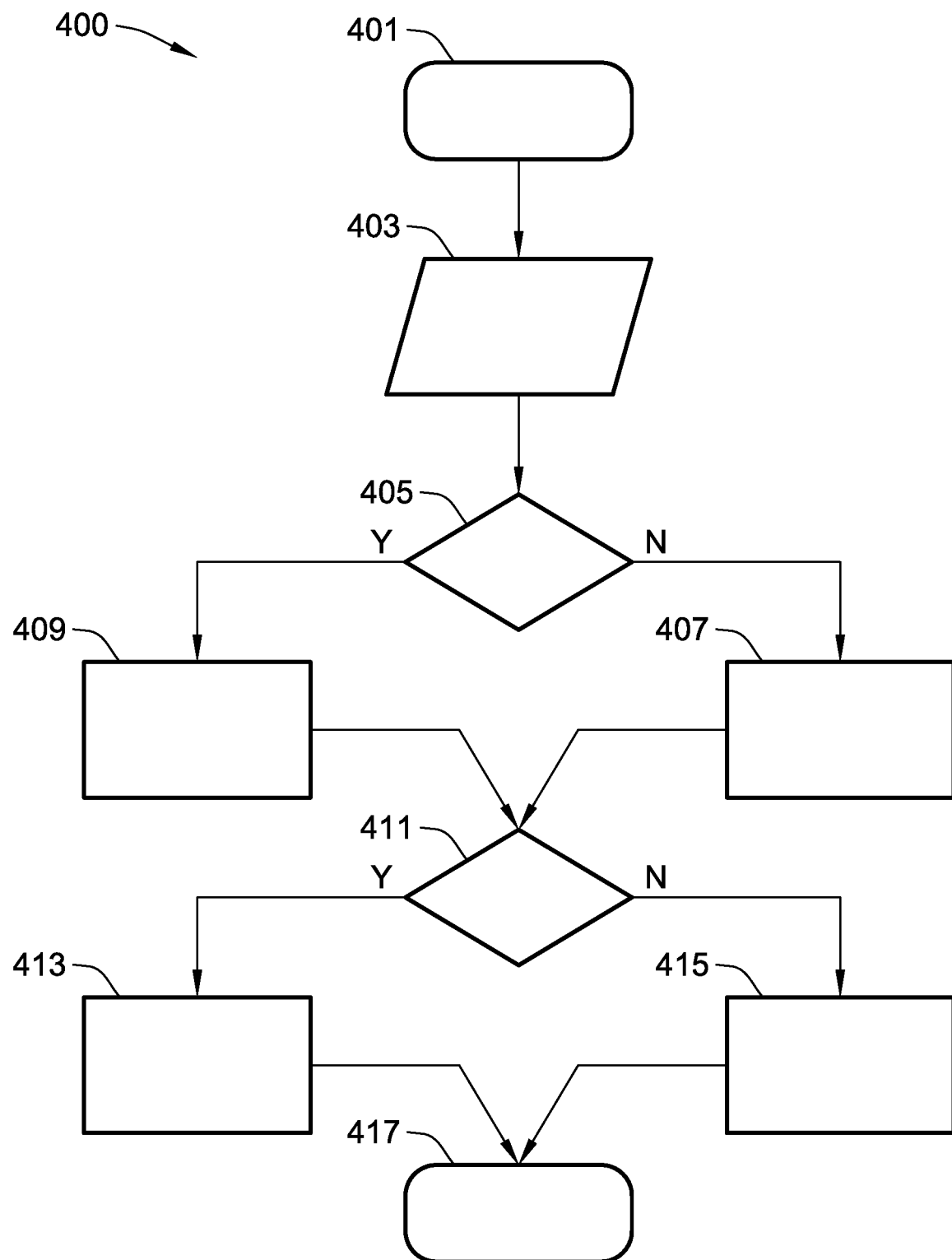
FIG. 11 is a is a flowchart illustrating a representative SOWC control algorithm for activating and deactivating an engine disconnect device, which may correspond to memory-stored instructions executed by onboard and/or remote control-logic circuitry, programmable electronic control unit, or other computer-based device or network of devices in accord with aspects of the disclosed concepts.

With reference now to the flowchart of FIG. 11, an improved method or control strategy for governing operation of a torque converter clutch, such as TCC assembly 202 of TC assembly 218 of FIG. 10, and an engine disconnect device, such as EDC assembly 228 of ICE assembly 212 of FIG. 10, is generally described at 400 in accordance with aspects of the present disclosure. Some or all of the operations illustrated in FIG. 11 and described in further detail below may be representative of an algorithm that corresponds to processor-executable instructions that may be stored, for example, in main or auxiliary or remote memory, and executed, for example, by a resident or remote controller, processing unit, control logic circuit, or other module, device and/or network of devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 400 begins at terminal block 401 of FIG. 11 with processor-executable instructions for a programmable controller or control module or similarly suitable processor to call up an initialization procedure for a TCC/EDC control protocol. This routine may be executed in real-time, continuously, systematically, sporadically, and/or at regular intervals during active vehicle operation. To carry out this protocol, a vehicle control system or any combination of one or more subsystems may be operable to receive, process, and synthesize pertinent information and inputs, and execute control logic and algorithms to regulate various powertrain components to achieve desired control targets. At input/output block 403, the method 400 includes receiving one or more electrical signals indicating a sensor measured value for a TCC apply pressure and a sensor measured value for a TCC release pressure.

At decision block 405, the method 400 determines if a real-time pressure difference between the TCC apply and release pressures is less than a calibrated activation pressure differential. If the vehicle ECU 25 or powertrain control module (PCM) not detects that the pressure difference exceeds the calibrated activation pressure differential (Block 405=NO), the method 400 proceeds to process block 407 and outputs one or more control command signals, e.g., to hydraulic control circuit 200 of FIG. 10, to slip the TCC and maintain the EDC in a bi-directionally engaged state. If, however, a positive determination is returned (Block 405=YES), the method 400 proceeds to process block 409 and outputs one or more control command signals, e.g., to hydraulic control circuit 200, to close the TCC and thereby mechanically lock the TC impeller at the output of the engine to the TC turbine at the input of the transmission.

Prior to, contemporaneous with, or after executing the determination and corresponding operations of blocks 405, 407 and 409, the method 400 determines, at decision block 411, whether or not the TCC apply pressure is greater than a calibrated pressure threshold. If so (Block 411=YES), method 400 proceeds to process block 413 and outputs one or more control command signals, e.g., to hydraulic control circuit 200 of FIG. 10, to disengage the EDC to operate in a unidirectional OWC state. The EDC may be disengaged while the TCC is maintained in a slipping state. However, if it is determined that the TCC apply pressure is below or falls below the calibrated pressure threshold (Block 411=NO), method 400 proceeds to process block 415 and outputs one or more control command signals, e.g., to hydraulic control circuit 200, to engage or maintain the EDC in an engaged state. As described above with respect to the graph of FIG. 9, the TCC may be engaged after the ECD is opened; optionally, the TCC may be opened prior to reengaging the ECD. The method 400 continues to terminal block 417 and temporarily terminates or returns to terminal block 401 and persists in a continuous loop.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Figure 12:
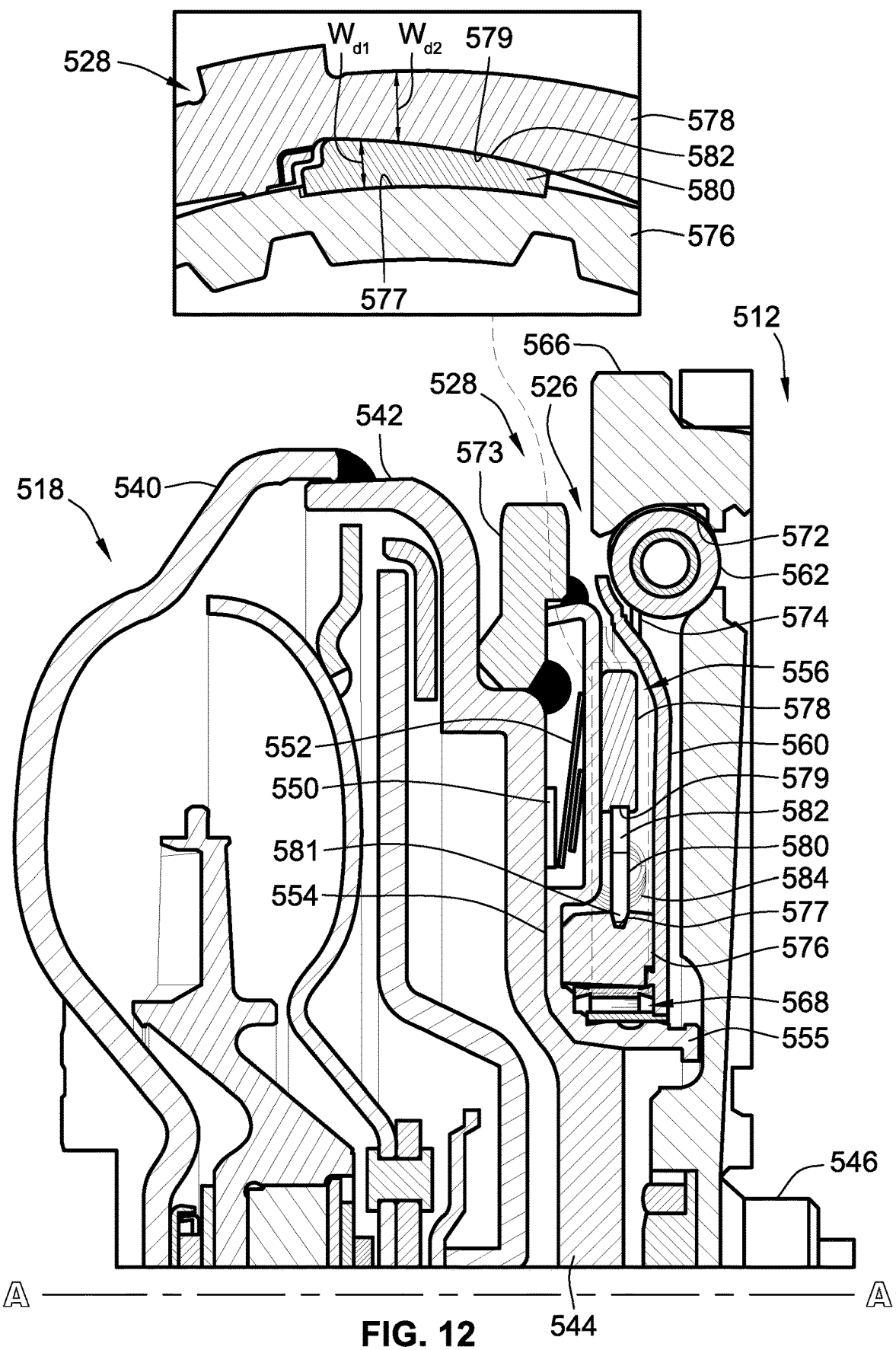
FIG. 12 is a cross-sectional, side-view illustration of select portions of a representative hydrodynamic torque converter assembly, wedge-type SOWC engine disconnect device, engine flexplate, and torsional damper assembly in accordance with aspects of the present disclosure.
Figure 13:
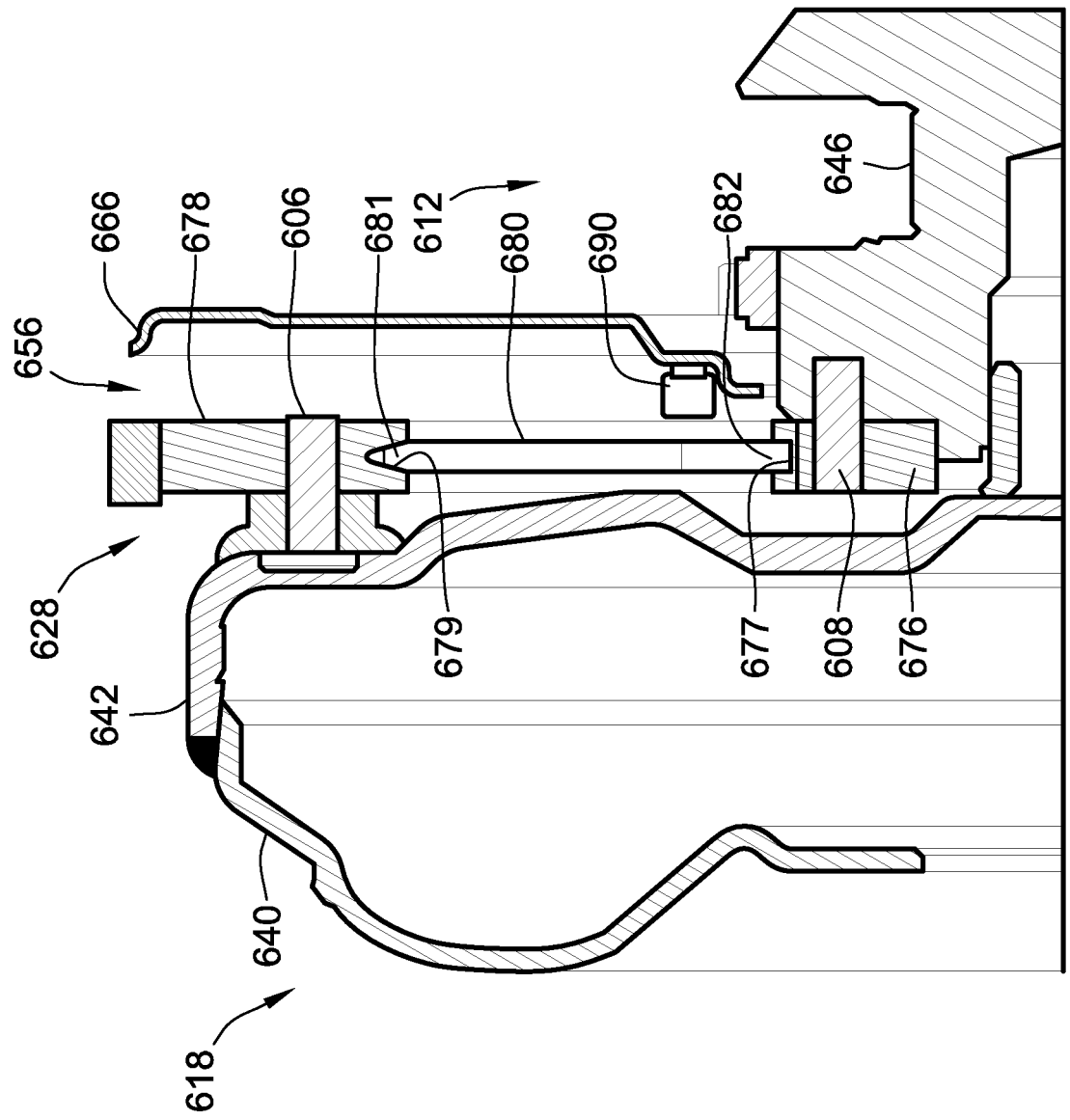
FIG. 13 is a cross-sectional, side-view illustration of select portions of a representative hydrodynamic torque converter assembly, another representative wedge-type SOWC engine disconnect device, engine flexplate, and torsional damper assembly in accordance with aspects of the present disclosure.

FIGS. 12 and 13 of the drawings illustrate two more representative engine disconnect devices 528 and 628, respectively, for drivingly connecting and disconnecting an internal combustion engine to/from a vehicle drivetrain. As mentioned above in the discussion of engine disconnect device 128 of FIG. 5, it is envisioned that any of the features and options set forth above with reference to the concepts presented in FIGS. 1-11 can be incorporated, singly or in any combination, into the exemplary architectures discussed below with respect to FIGS. 12 and 13, and vice versa. Similar to the torque converters 18 and 118 of FIGS. 2 and 5, for example, the TC assemblies 518 and 618 of FIGS. 12 and 13 are hydrodynamic torque transmitting devices that provide a drive coupling between the engine and transmission. TC assemblies 518, 618 both include a transmission-side pump shell 540, 640 that is fixedly attached to an engine-side pump cover 542, 642 such that a working hydraulic fluid chamber is formed therebetween. Akin to engine hubs 46 and 146 of FIGS. 2 and 5, each engine hub 546 and 646 of FIGS. 12 and 13 is spline indexed to an engine output shaft, such as crankshaft 13 of FIG. 1, with an axially-flexible engine flexplate 566 and 666 bolted directly to the engine hub 546, 646.

According to the illustrated architectures of FIGS. 12 and 13, engine disconnect devices 528, 628 are portrayed as wedge-type SOWC assemblies with radially displaceable locking elements. In line with the representative design in FIG. 12, for example, the engine disconnect device 528 is generally comprised of (from left-to-right): a selector plate 550, a flex ring 552, a reaction ring 554, and a wedge-type SOWC 556. The foregoing elements circumscribe and are directly or indirectly supported on a central hub 544, which is integrally formed with and projects axially from an exterior, engine-side surface of the pump cover 542. Similar to the torsional damper assembly 26 of FIG. 2, a torsional damper assembly 526 of FIG. 12 is generally comprised of a torsional damper plate 560 with one or more spring-mass damper systems ("SDS") 562 that operatively attach the damper plate 560 to the engine flexplate 56. The damper plate 560, SDS 562 and flexplate 56 are all supported by the engine hub 546, which is rigidly secured to the crankshaft of engine 512 to rotate in unison therewith.

The selector plate 550 of FIG. 12 may be structurally similar to the selector plate 50 of FIG. 2 and therefore may function in an analogous manner to selectively switch the operating state of the engine disconnect device 528. Selector plate 550, when deactivated, may sit flush against the engine-side surface of the pump cover 542, with the toroidal flex ring 552 compressed between the reaction ring 554 and selector plate 550. Reaction ring 554 is bolted or otherwise rigidly mounted to the pump cover 542 to rotate in unison therewith. Projecting radially outward from an OD perimeter of the reaction ring 554 is a succession of integrally formed ring gear teeth 573 that operatively engage with gear teeth of a motor generator unit, such as traction motor 14 of FIG. 1. Shown sandwiched between the selector plate 550 and damper plate 560, wedge-type SOWC 556 is rotatably mounted onto the pump cover's central hub 544 via a radial bearing 568 to rotate about axis A-A. As best seen in FIG. 12, the engine flexplate 566 if fabricated with a transmission-side cavity that nests therein the SOWC 556 and damper plate 560. Damper assembly 526, in turn, is interposed between the flexplate 566 and engine disconnect device 528, with the flexplate 566 bolted directly to the engine hub 546.

With continuing reference to FIG. 12, the SDS 562 mate the torsional damper plate 560 and the wedge-type SOWC 556 with the engine flexplate 566 such that the damper plate 560 and SOWC 556 (when engaged) rotate in unison with the flexplate 566 with limited rotational movement therebetween. In the vein of damper assemblies 26 and 126 of FIGS. 2 and 5, each SDS 562 of FIG. 12 is seated within a respective spring receptacle 572 of the engine flexplate 566 such that the free lengths of the helical springs are elongated along the circumference of the flexplate 566. When the flexplate 566 rotates under the driving power of the engine assembly 512, spring retainers of each SDS 562 are pressed against respective circumferentially spaced walls of the spring receptacles 572. This causes the springs of the SDS 562 to compress against integral spring tabs 574 that project axially from the damper plate 560. Once the SDS 562 are sufficiently compressed, crankshaft torque is transmitted from the engine hub 546 and flexplate 566, through the SDS 562 and damper plate 560, to the wedge-type SOWC 528.

In order to manage the transmission of rotational power and torque between the prime mover and final drive system, a wedge-type SOWC engine disconnect device 528 mechanically couples and selectively decouples engine 512 and TC assembly 518. Like disconnect devices 28 and 128, engine disconnect device 528 is operable to carry forward (positive) torque and reverse (negative) torque, overrun in both forward and reverse directions, and operatively disengage to freewheel in opposing forward and reverse directions. In the illustrated example, the wedge-type SOWC 558 includes an annular inner race 576 that is concentrically aligned within an annular outer race 578. The inner race 576 is bolted, riveted, welded, integrally formed with or otherwise rigidly attached to the torsional damper plate 560 for mutual rotation therewith. Conversely, the outer race 578 is rigidly attached to the TC pump cover 542, e.g., via rigid coupling to reaction ring 554, for mutual rotation therewith. Projecting axially from the reaction ring 554 is an engine-side toroidal hub 555 within which is cupped the central hub 544 of pump cover 542. Radial bearing 568 rotatably mounts the SOWC's inner race 576 onto the toroidal hub 555 and, thus, onto the pump cover's central hub 544. A distal end face of the toroidal hub 555 nests within the transmission-side cavity of the flexplate 566, limiting axial displacement of the flexplate 566 towards the TC assembly 518 and engine disconnect device 528. While potentially less practical, it is envisioned that the outer race 578 may be mounted to the damper plate 560 with the inner race 576 mounted to the pump cover 542. Furthermore, the outer (or inner) race 578 may be rigidly mounted to other TC input structure besides the pump cover 542, such as the pump shell 540 or a TC input shaft.

Disposed between and selectively rotatably coupling the inner and outer races 576, 578 of the wedge-type SOWC 556 is a radially expandable and retractable wedge plate 580. In accord with the illustrated example, wedge plate 580 may be fabricated as a single-piece, unitary structure with an annular shape and multiple circumferentially spaced ramps 582 (best seen in inset view of FIG. 12). To enable measurable radial expansion/retraction during operation of the SOWC 528, the wedge plate 580 may be fabricated as a discontinuous annulus or, alternatively, as continuous ring with integrally formed leaf-spring arms (not shown) that interconnect the ramps 582. Each ramp 582 has a (first) variable radial width $W_{d1}$ typified by a radial distance to the outer edge of the wedge plate 580 progressively decreasing (or increasing) in a clockwise (or counterclockwise) direction from left-to-right in the inset view of FIG. 12. The inner diameter (ID) surface of the SOWC outer race 578 is fabricated with numerous recessed grooves 579 that are circumferentially spaced from one another about the interior perimeter of the race 578. Placed in opposing faced relation to the ID surface of the outer race 578 is an outer diameter (OD) surface of the inner race 576, which is fabricated with several recessed pockets 577 that are circumferentially spaced from one another about the exterior perimeter of the race 576. Each wedge plate ramp 582 is slidably mounted within one discrete groove 579 and one discrete pocket 577; with this configuration, the ramps 582 slide back-and-forth along an arcuate path that is rotationally centered at axis A-A.

With continuing reference to FIG. 12, the wedge plate 580 rotates back-and-forth about central axis A-A from an engaged (first) position to a disengaged (second) position. Moving the wedge plate 580 to the engaged position will frictionally wedge or "lodge" the ramps 582 between the ID and OD surfaces of the SOWC races 576, 578 to thereby transfer torque between the inner and outer races 576, 578. Wedging the ramps 582 in this manner causes the races 576, 578 and wedge plate 580 to rotate un unison with one another. Contrariwise, shifting the wedge plate 580 to the disengaged position will unwedge or "dislodge" the ramps 582 from between the ID and OD surfaces of the SOWC races 576, 578. Dislodging the ramps 582 frees the inner and outer races 576, 578 to rotate with respect to each other. One or more helical compression springs 584 bias the wedge plate 580 to the engaged position in order to preload the ramps 582 into their wedged states and place the SOWC in a lock-lock operating condition.

Each of the grooves 579 recessed into the ID surface of the outer race 578 has a semi-elliptical cam surface with a (second) variable radial width Wd2. Having a cammed surface allows the recessed grooves 579 to convert the sliding, arcuate motion of the ramps 582 into a linear compressive force that releasably fixes the wedge plate 580 to the races 576, 578. Additionally, each pocket 577 recessed into the OD surface of the inner race 576 has a V-shaped or U-shaped cross-sectional profile (e.g., profile of pocket 577 best seen in outset view of FIG. 12). An ID perimeter of the wedge plate 580—opposite the OD perimeter with ramps 582—has a rounded edge 581 that nests inside the recessed pockets 577 of the inner race 576. Providing the wedge plate 580 with a rounded ID edge 581 that complements the profile of the pockets 577 provides a better frictional engagement and compressive lock between the wedge plate 580 and inner race 576. It should be appreciated that the number, shape, distribution, and/or size of the ramps 582 may be modified from the illustrated example to accommodate other intended applications. Furthermore, wedge plate 580 may be fabricated as a one-piece structure, as shown, or may be segmented into discrete wedge plates arranged in a circular array between the two races 576, 578. In addition, while shown with outwardly projecting ramped edges on the outer periphery of the wedge plate 580, a wedge plate may have one or more inwardly projected ramped edges, as will be discussed in further detail below in connection with FIG. 13.

Analogous to the selector plate 50 of FIGS. 2 and 3, the selector plate 550 may be selectively actuable, e.g., via ECU 25 of FIG. 1 through operation of hydraulic control circuit 200 of FIG. 10, to move back-and-forth along a rectilinear path to transition between deactivated and activated states. When activated, this selector plate 550 switches the wedge-type SOWC 556 from a torque-carrying (locked) state to a non-torque-carrying (freewheeling) state. Conversely, deactivating the selector plate 550 will switch the SOWC 556 from a non-torque-carrying state to a torque-carrying state. The deactivated selector plate 550 lays generally flush against the TC pump cover 542 and operatively disengages the wedge plate 580. Selector plate 550 slides axially, e.g., from left-to-right in FIG. 12 on a path parallel to axis A-A, from the deactivated to the activated state. Activating the selector plate 550 displaces it away from the pump cover 542 such that the plate 550 rotates the wedge plate 580— against the preloading bias force of spring 584—from the engaged state to the disengaged state. Rotating the wedge plate 580 in this manner operates to dislodge the ramps 582, as described above.

To convert the translational motion of the selector plate 550 into the rotational motion of the wedge plate 580, the selector plate 550 of FIG. 12 may be fabricated with ramped shanks (e.g., integrally formed shanks 100 in the inset view of FIG. 4). As noted above, these ramped shanks 100 may be circumferentially spaced in an equidistant manner about, and project axially from the selector plate's engine-side surface. The wedge plate 580 may be formed with a series of circumferentially spaced windows (e.g., windows 102 of FIG. 4) that receive the ramped shanks 100. Sliding the selector plate 550 from the deactivated position to the activated position will contemporaneously slide each ramped shank 100 against the inner perimeter of its corresponding window 102. Axially angled contact surfaces of the shanks 100 apply a moment force to the wedge plate 580 via windows 102 to rotate the wedge plate 580 to the disengaged state. Shifting the select plate 550 back to the deactivated position will operatively disengage the ramped shanks 100 from the windows 102, allowing the wedge plate 580 to rotate back to the engaged state and, thus, move the ramps 582 to their wedged positions.

Comparable to the back-to-back SOWC engine disconnect device 28, engine disconnect device 528 of FIG. 12 may employ hydraulically actuated, spring-loaded pistons 104 (e.g., piston 104 in FIG. 3) to move the selector plate 550 to the activated state. A single piston or, if desired, a distributed arrangement of pistons may be mounted to the pump cover 542 of the TC assembly 518, e.g., as described above with respect to piston 104 and TC assembly 18. By increasing the hydraulic pressure inside the internal fluid chamber of the TC assembly 518, the piston(s) will stroke, e.g., left-to-right in FIG. 12, and push the selector plate 550 to the activated state. Reducing this internal hydraulic pressure will allow each piston's return spring (e.g., helical springs 106) to bias the piston back to a deactuated position. At the same time, toroidal flex ring 552 presses against and biases the selector plate 550 to the deactivated state. Annular reaction ring 554, which circumscribes the selector plate 550 and flex ring 552, provides a reaction surface against which the flex ring 552 presses.

Presented in FIG. 13 is another example of a wedge-type SOWC engine disconnect device 628 for drivingly engaging and disengaging an engine 612 to and from a torque converter assembly 618. Unless stated otherwise, the general operation of the SOWC 656 of FIG. 13 may be comparable to the general operation of the SOWC 556 of FIG. 12. For instance, in contrast to the representative architecture presented in FIG. 12, wherein the wedge plate 580 is displaced radially inward to lock to the inner race 576 to the outer race 578 of the SOWC 556, the wedge-type SOWC 656 of FIG. 13 includes a wedge plate 680 that displaces radially outward to lock to an inner race 676 to an outer race 678. Another point of demarcation lies in the fact that the outer race 678 of FIG. 13 is mechanically coupled directly to the TC pump cover 642, e.g., via bolts 606, whereas the inner race 676 is mechanically coupled directly to the engine hub 646, e.g., via rivets 608. Other differences include pockets 677, which are recessed into the OD surface of the inner race 676, being fabricated with cammed surfaces; grooves 679, which are recessed into the ID surface of the outer race 678, are fabricated with V-shaped or U-shaped cross-sectional profiles. In this regard, the ramps 682 face radially inward from the wedge plate 680, whereas the rounded edge 681 projects radially outward. Lastly, the engine disconnect device 628 of FIG. 13 employs an electronic solenoid 690, rather than a hydraulic piston, to selectively shift the wedge plate 680 between engaged and disengaged positions and thereby change the operating status of the disconnect device 628 between locked and unlocked states.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An engine disconnect device for a motor vehicle, the motor vehicle including an engine, a flexplate connected to the engine, a torsional damper plate connected to the flexplate, and a torque converter (TC) assembly with a pump cover, the engine disconnect device comprising:
    a first one-way clutch (OWC) including first inner and outer races with a first plurality of torque elements interposed between and transferring torque across the first inner and outer races in a first direction, the first outer or inner race being configured to attach to the torsional damper plate for common rotation therewith, and the first inner or outer race being configured to attach to the pump cover of the TC assembly for common rotation therewith; and
    a second OWC coaxially aligned with the first OWC, the second OWC including second inner and outer races and a second plurality of torque elements interposed between and transferring torque across the second inner and outer races in a second direction, the second outer or inner race being configured to attach to the pump cover for common rotation with the first inner race and pump cover, and the second inner or outer race being configured to attach to the torsional damper plate for common rotation therewith.

2. The engine disconnect device of claim 1, further comprising a selector plate adjacent the first and second OWCs and selectively actuable to move between an activated state and a deactivated state to thereby switch the first and/or second OWC between a torque-carrying state and a non-torque-carrying state, respectively.

3. The engine disconnect device of claim 2, further comprising a roller cage interposed between the selector plate and the first and second OWCs, the roller cage pressing the first and/or second pluralities of torque elements to torque-transmitting positions.

4. The engine disconnect device of claim 3, wherein the selector plate moves rectilinearly from the deactivated state to the activated state to thereby rotate the roller cage from an engaged state to a disengaged state whereby the roller cage frees the first and/or second pluralities of torque elements to shift to non-torque-transmitting positions.

5. The engine disconnect device of claim 4, wherein the selector plate includes multiple ramped shanks circumferentially spaced on and projecting axially from the selector plate, and the roller cage includes multiple windows each receiving therethrough a respective one of the ramped shanks, wherein moving the selector plate to the activated position slides the ramped shanks against perimeters of the windows to rotate the roller cage to the disengaged state.

6. The engine disconnect device of claim 5, further comprising a plurality of spring-loaded pistons configured to mount to the pump cover of the TC assembly such that hydraulic pressure within the TC assembly exceeding a predetermined spring force value causes the spring-loaded pistons to stroke and push the selector plate from the deactivated state to the activated state.

7. The engine disconnect device of claim 6, further comprising a toroidal flex ring pressing against and biasing the selector plate from the activated state to the deactivated state.

8. The engine disconnect device of claim 7, further comprising an annular reaction ring circumscribing the selector plate and configured to rigidly attach to the pump cover of the TC assembly, wherein the toroidal flex ring is compressed between the reaction ring and selector plate.

9. The engine disconnect device of claim 1, wherein the first inner race includes a plurality of mounting tabs circumferentially spaced around and projecting axially from a TC-side face of the first inner race, the mounting tabs being configured to weld, bolt, and/or rivet to the pump cover of the TC assembly.

10. The engine disconnect device of claim 9, wherein the second outer race is splined to the first inner race.

11. The engine disconnect device of claim 1, wherein the first plurality of torque elements includes multiple first rollers circumferentially spaced around the first inner race, and the second plurality of torque elements includes multiple second rollers circumferentially spaced around the second inner race.

12. The engine disconnect device of claim 11, further comprising:
multiple first springs each biasing a respective one of the first rollers to a non-torque-transmitting position; and
multiple second springs each biasing a respective one of the second rollers to a non-torque-transmitting position.

13. The engine disconnect device of claim 12, wherein:
the first outer race includes multiple first roller pockets recessed into an inner diameter surface of the first outer race, each of the first roller pockets nesting therein a respective one of the first rollers and a respective one of the first springs, and
the second outer race includes multiple second roller pockets recessed into an inner diameter surface of the second outer race, each of the second roller pockets nesting therein a respective one of the second rollers and a respective one of the second springs.

14. A hybrid electric powertrain comprising:
an internal combustion engine with a crankshaft attached to a flexplate;
a torsional damper assembly with multiple springs mounted to a damper plate;
an electric traction motor;
an automatic power transmission configured to transmit torque generated by the engine and traction motor to a final drive system;
a torque converter (TC) assembly connecting the engine and traction motor to the power transmission, the (TC) assembly including a TC housing with a pump cover; and an engine disconnect device located between the engine and the power transmission, the engine disconnect device including:
a first one-way clutch (OWC) with concentric first inner and outer races and a first plurality of torque elements interposed between and transferring torque across the first inner and outer races in a first direction, the first outer race being rigidly attached to the torsional damper plate for common rotation therewith, and the first inner race being rigidly attached to the pump cover of the TC assembly for common rotation therewith; and
a second OWC concentrically aligned within the first OWC, the second OWC including concentric second inner and outer races and a second plurality of torque elements interposed between and transferring torque across the second inner and outer races in a second direction, opposite the first direction, the second outer race being splined to the first inner race for common rotation with the first inner race and the pump cover, and the second inner race being rigidly attached to the torsional damper plate for common rotation therewith.

15. A method of assembling an engine disconnect device for a motor vehicle with an engine, a flexplate connected to the engine, a torsional damper plate connected to the flexplate, and a torque converter (TC) assembly with a pump cover, the method comprising:
providing a first one-way clutch (OWC) with first inner and outer races and a first plurality of torque elements interposed between and transferring torque across the first inner and outer races, the first outer or inner race being configured to attach to the torsional damper plate for common rotation therewith, and the first inner or outer race being configured to attach to the pump cover of the TC assembly for common rotation therewith; and
mounting a second OWC coaxial with the first OWC, the second OWC including second inner and outer races and a second plurality of torque elements interposed between and transferring torque across the second inner and outer races, the second outer or inner race being configured to attach to the pump cover for common rotation with the pump cover, and the second inner or outer race being configured to attach to the torsional damper plate for common rotation therewith.

16. The method vehicle of claim 15, further comprising positioning a selector plate adjacent the first and second OWCs, the selector plate being selectively actuable to move between an activated state and a deactivated state to thereby switch the first and/or second OWC between a torque-carrying state and a non-torque-carrying state, respectively.

17. The method vehicle of claim 16, further comprising positioning a roller cage between the selector plate and the first and second OWCs, the roller cage pressing the first and/or second pluralities of torque elements to torque-transmitting positions.

18. The method vehicle of claim 17, wherein the selector plate moves rectilinearly from the deactivated state to the activated state to thereby rotate the roller cage from an engaged state to a disengaged state whereby the roller cage frees the first and/or second pluralities of torque elements to shift to non-torque-transmitting positions.

19. The method vehicle of claim 18, further comprising abutting a toroidal flex ring against the selector plate, the toroidal flex ring biasing the selector plate from the activated state to the deactivated state.

20. The method vehicle of claim 15, wherein the second outer race is splined to the first inner race, and wherein the first inner race includes a plurality of mounting tabs circumferentially spaced around and projecting axially from a TC-side face of the first inner race, the mounting tabs being configured to weld, bolt, and/or rivet to the pump cover of the TC assembly.

* * * * *